(12) United States Patent
Shinbo et al.

(10) Patent No.: US 6,185,076 B1
(45) Date of Patent: Feb. 6, 2001

(54) MAGNETIC HEAD CARRIAGE FOR HARD DISK DRIVE

(75) Inventors: Yoshinori Shinbo, Okaya; Takeo Shinmura, Utsunomiya, both of (JP)

(73) Assignee: Kyoei Denko Co., Ltd., Okaya (JP)

( * ) Notice: Under 35 U.S.C. 154(b), the term of this patent shall be extended for 0 days.

(21) Appl. No.: 09/199,342

(22) Filed: Nov. 25, 1998

(30) Foreign Application Priority Data

Nov. 26, 1997 (JP) .................................................... 9-339451

(51) Int. Cl.⁷ ............................ G11B 21/16; B24B 31/00
(52) U.S. Cl. ........................ 360/265.7; 451/36; 451/104
(58) Field of Search .............................. 360/106, 265.7, 360/265.9, 266.5; 451/36, 93, 103, 104, 113

(56) References Cited

U.S. PATENT DOCUMENTS

| | | | |
|---|---|---|---|
| 3,898,769 | * 8/1975 | Makedonski et al. | 451/209 |
| 4,030,249 | * 6/1977 | Kochemidov et al. | 451/246 |
| 4,169,713 | 10/1979 | Chachin et al. | 51/7 |
| 4,170,849 | 10/1979 | Sakulevich et al. | 51/7 |
| 4,870,525 | * 9/1989 | Wong et al. | 360/137 |
| 5,404,680 | * 4/1995 | Mizuguchi et al. | 451/36 |
| 5,731,930 | * 3/1998 | Maggio et al. | 360/104 |
| 5,870,253 | * 2/1999 | Ogawa et al. | 360/104 |
| 5,931,718 | * 8/1999 | Komanduri et al. | 451/36 |
| 5,971,835 | * 10/1999 | Kordonski et al. | 451/38 |

FOREIGN PATENT DOCUMENTS

| | | |
|---|---|---|
| 2 173 433 | 10/1986 | (GB) . |
| 07040226 | 2/1995 | (JP) . |
| 07227755 | 8/1995 | (JP) . |

* cited by examiner

*Primary Examiner*—William Klimowicz
(74) *Attorney, Agent, or Firm*—Armstrong, Westerman, Hattori, McLeland & Naughton

(57) ABSTRACT

A carriage for a hard disc drive polished as final finish has high surface precision of micron order. The finish surface is smooth, a cutting trace does not exist, and the surface layer is hardened uniformly by a magnetic material being hit by magnetic power. A cutting bur the edge of which is very tiny does not fall after installing the hard disc drive. The carriage for the magnetic head of the hard disc are not influenced by a temperature change and a seasonal change. The present invention forms a magnetic polishing brush by keeping magnetic abrasive material between magnetic poles in the carriage as a head arm member formed by extrusion molding or drawing for the magnetic head of the hard disc drive. The carriage of non-magnetic material as an aluminum part of HDD inserted in the above described magnetic polishing brush, is given reciprocation motion and vibration, thus the surface of the above described part is polished. The final finish is made by magnetic beam processing to polish or remove burs. Further, surface polish as final finish of the carriage is made by the above described magnetic beam processing using feeble magnetism, the relative magnetic permeability of which is 1.5 to 200, as the above described abrasive material. Further, stainless steel, nickel alloy or iron alloy having the same hardness as said stainless steel is used as the above described polish material.

6 Claims, 23 Drawing Sheets

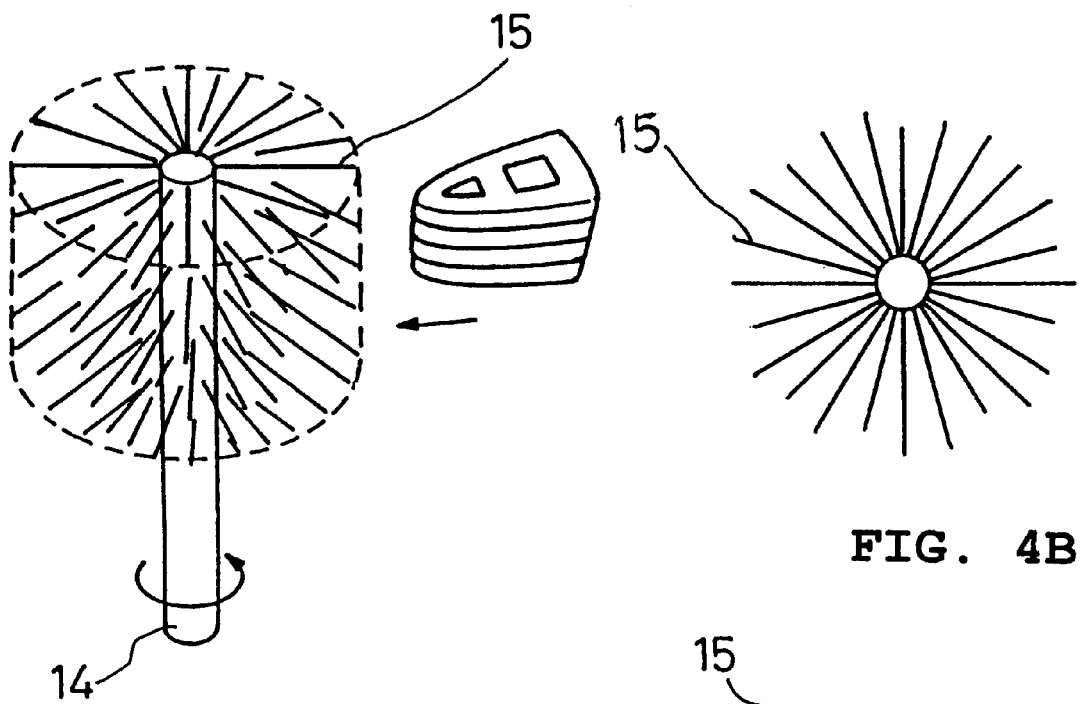
FIG. 4A
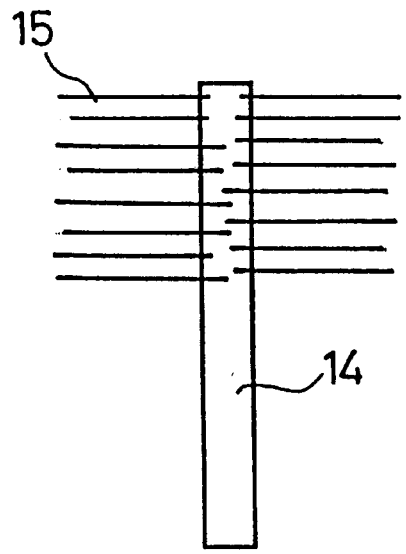
FIG. 4B
FIG. 4C

BRUSH PROCESSING + MANUAL PROCESSING

BRUSH PROCESSING + MANUAL PROCESSING

ELECTROLYTIC POLISHING

ELECTROLYTIC POLISHING

MAGNETIC POLISHING (MAGNETIC BEAM PROCESSING)

MAGNETIC POLISHING (MAGNETIC BEAM PROCESSING)

MAGNETIC HEAD CARRIAGE FOR HARD DISK DRIVE

BACKGROUND OF THE INVENTION

1. Field of the Invention

This invention relates to a magnetic head carriage, so called a head arm member or an access arm, for a hard disc drive formed by drawing or extrusion molding, more particularly to a carriage, the head arm member or access arm, with novel surface finish polish.

2. Description of Related Art

FIG. 1 is a perspective view of a magnetic head carriage as a head arm member or an access arm for a hard disc drive, hereinafter HDD is used, as an example. The carriage 1 includes a base member 1a and a plurality of plate members 1b as arm members formed integrally as a comb shape extending parallel in the outer direction from the base member 1a. A plurality of slits 1f are provided between the plate members 1b. A support shaft hole 1c is provided in the base member 1a, and an opening 1e for lessening the weight of the plate members 1b and a head installation hole 1d for installing the magnetic head are formed by cutting work on the top of each plate member 1b formed in the triangle shape or the like viewed from the upper direction. A plurality of head arm members 1b move between a plurality of discs in the protrudent direction, and the magnetic head installed in the top position is capable of reading information from the disc.

Here, one example, in which the shape of the carriage is different from the above described type, of the head arm portion of the magnetic disc is explained using FIGS. 2A, 2B and 3.

In the disc apparatus, a magnetic head is provided on the both sides or a single side of each magnetic disc in a plurality of magnetic discs. The magnetic head is installed in the pointed end of a suspension, and the suspension is installed in the top position of a carriage arm of an actuator assembly. Thus, the carriage arm, namely the magnetic head, is capable of being positioned in an appointed position by moving in the radius direction of the magnetic disc when the actuator of the actuator assembly is driven.

FIG. 3 is a perspective view of one example of the actuator assembly. In the actuator assembly 6 shown in FIG. 3, one side of a rotating shaft 5 is a driving portion 7 as the actuator and the other side is a carriage arm 8 rotating by the rotating shaft 5. The driving portion 7 includes a voice coil 9 installed on a coil supporting plate 7a and a flexible printed circuit (FPC) 7c supported by a fixed portion 7b. Here, the numeral 7d means a pressure plate. The necessary numbers of carriage arms are provided corresponding to the numbers of the magnetic discs, and a magnetic head assembly 11 is installed in two sides or one side of the top installation portion 10 as shown in FIGS. 2A and 2B, thus the magnetic head 13 is capable of being positioned in the appointed position in the radius direction of the magnetic disc 4. In the top installation portion 10, a hole 10a is provided for installing the magnetic head assembly 11 on two sides or one side of the top installation portion 10. Here, a magnetic arm means a block in which the magnetic head assembly 11 is installed in the actuator assembly 6.

This invention relates to the magnetic head carriage described above made of improved materials. Usually, in the above described carriage, the opening 1e or the hole 1d is formed by cutting work materials after drawing or extrusion molding. In FIG. 1, a bur would be made around each plate portion 1b of above mentioned magnetic head carriage or in angle positions of holes 1c and 1d, and opening 1e, by cutting work, drawing, or extrusion molding. If the apparatus is assembled without treating the bur, there are problems in which the bur damages the disc surface by contacting with the disc surface and the disc and the head would be damaged because the bur would be caught between the disc and the head and cutting work scraps would drop on the disk. Thus, it should be carefully done to remove the bur and chamfer. Further, a film or an alien substance would adhere to the plate members 1b in the hard disc assembly process for the next process, thus it should be securely done to remove and clean the film and alien substance. For the hard disc drive, the disc rotates at a high speed and the gap between the magnetic head and the magnetic disc is 0.005 to 0.10 $\mu$m as an ultra-minute mechanism, thus such high precision rate that thickness dimensional tolerance of each plate member 1b and form tolerance for each plate should be under 20 $\mu$m is required to the above described carriage. The above described precision is so high that HDD will crush even if tiny dust exists in the gap between the magnetic disc and the magnetic head when the disc is running because the magnetic head and the magnetic disc are damaged and the chip would damage the magnetic head and the magnetic disc as a synergy effect.

In the head arm member 1 of the above described FIG. 1, however, it is impossible to automatically remove the bur made in the angle position of the hole 1c, 1d, and 1e of the plate member 1b with comb shape because a processing tool is not able to enter inside. Thus, many people cannot help cleaning the bur using a brush, then actually a large amount of money is spent for just only finishing process. Further, in the method of removing the bur by a human being's hand, it might be impossible to make processing for the inside of the above described head arm member 1 arranged in a complicated manner. Thus, there is a problem in which the head arm member 1 is not capable of being small and light because the structure of the head arm member 1 should be changed to the simpler structure. Further, this type of problem is found not only in the above described head arm member 1, but also in surface processing or surface treatment for precision parts having the hole or the opening inside and the narrow wide slit outside, thus there is another problem in which the capability of producing a variety of products is disturbed.

Further, there are electrolytic polishing, a shot method, or an ultrasonic method as a polishing method for those portions. There are defective points in which dimensional tolerance of each plate member is not capable of being solved if the bur is removed enough by electrolytic polishing and inside processing is impossible although outside surface processing is possible by the shot method. Further, the ultrasonic method does not have enough power to remove the bur, thus processing becomes uneven. Thus, those processing methods are not capable of being used because the surface shape inside the comb teeth made with a micron accuracy is destroyed. Unavoidably, those portions are processed by a brush by the human being's hand using abrasive material. Thus, there have been defective points in which polish efficiency has been very bad and the cost would be high because one hundred percent test has been required since the polish processing has been made by the human being's hand. Further, the bad quality rate based on processing has been high.

The applicant discloses a method and an apparatus in which the bur of the surface beyond one's reach or inside nonmagnetic parts is removed using a machine using magnetic beam processing additionally, so called magnetic polishing.

Here, surface finishing polish for the above described carriage based on the conventional manual processing is explained in detail. Conventionally, firstly, the big bur which can be seen by one's eye is removed roughly by rotating a metal brush as shown in FIGS. 4A, 4B, and 4C. The above described metal brush has the structure in which a number of wire brushes grow densely in a prop 14 in the same circle direction as shown in FIGS. 4A, 4B, and 4C, and, as shown in FIG. 4A, polish processing is made in such a way that the prop is rotated in the arrow direction and then the above described carriage is pressed by one's hand from one side. After the above described rough polish processing is finished, then small burs are removed by cutting with a knife using a microscope. In FIGS. 5 and 6, the picture of the carriage surface finished by the manual processing is shown. Here, FIG. 5 is a magnified picture of the portion of "A" of FIG. 7, and the magnification rate becomes bigger from the top to the bottom. Further, FIG. 16 is a magnified picture of the portion of "B" of FIG. 7, and the magnification rate becomes bigger from the top to the bottom.

As identified by the pictures clearly, one direction traces are kept in the carriage surface finished by manual processing. This phenomenon, as shown in FIGS. 4A, 4B, and 4C, is based on processing in which the only conspicuous bur is cut with the knife using the microscope by one's hand after rough removal is made by the metal brush with manual processing. Accordingly, the most part of the surface is kept with the rough removal condition, namely final polish condition in which polish processing was made by the metal brush.

Accordingly, as shown in the pictures of FIGS. 5 and 6, there are cutting stripe traces made mostly by the first rotating brush and kept on the finish surface. Further, face precision at least in the cutting portion would be dynamically beyond the range of a standard, 20 $\mu$m comb thickness, because cutting volume depends on one's pressure since small burs are cut by one's hand with the knife. Further, manual processing requires skill, does not keep uniform processing, and increases costs because processing efficiency goes down if excellent finish is required. Recently, as the production method for the magnetic head carriage of the above described HDD, there is a tendency in which the carriage is assembled using each plate produced by a press working. This is based on the bur problem found in integral production. The HDD rotates at high speed, the magnetic head employs a surface method, and a space between the head and the disc is 0.05 to 0.10 $\mu$m during disc s rotating, thus the head is so delicate as for surface stability to become unstable even if dust in the air enters in the space. Further, after the head collides with the disc once, the situation caused by dust and a broken piece produced by collision between both of them becomes suddenly bad. As a result, crushing occurs. Thus, metal chips should not exist there.

There is a risk, in which a small metal chip drops inside the HDD by HDD vibration, for surface finish by manual processing. For one thing, although a tiny bur can be removed by the knife as explained before, scratch stripe traces by the metal brush are kept on most of surfaces and the small burs exist on the edge of the scratch stripe traces. Secondly, the tiny burs are removed by cutting work with the knife, so there exist still more tiny burs on the edge in which the burs are removed by the knife. Still, an oversight occurs since visual observation is applied. Final finish by manual processing not only increases costs since manual processing is a time consuming job, but also occurs the above described defect points on the finish surface.

FIGS. 8 and 9 are pictures showing surface conditions by electrolytic polishing for reference. FIGS. 8 and 9 are magnified pictures of "A" and "B" of FIG. 7 in the same way as FIGS. 5 and 6. Here, referring to electrolytic polishing, the surface is smooth like a mirror according to electrolytic polishing, so the tiny bur exists little on the surface since electrolytic polishing is capable of polishing more powerfully than magnetic polishing of the present invention or the conventional manual processing. The biggest defect point of electrolytic polishing, however, is the impossibility for the polish extent not to be capable of being controlled. Generally speaking, the burs do not exist in the same way, but the size of the burs differ in various ways. The surface precision deteriorates since the tiny burs are removed excessively if electrolytic polishing is applied for a long time in order to remove big burs. Electrolytic polishing is capable of polishing notched surfaces better than the smooth surfaces, so the polish volume is not the same for all surfaces. Thus, the surface precision in which the plate thickness is within 20 $\mu$m cannot be kept since over-cutting work occurs if all the burs are removed, and still the precision standard cannot be satisfied since the big burs are kept if the surface precision is tried to bucket. After all, electrolytic polishing cannot be used for finish polish of the above described carriage. Further, electrolytic polishing may be used only for the final finish polish, but this usage will increase processing steps and costs because polish processing is duplicated with other polish methods.

SUMMARY OF THE INVENTION

Up to now, it has been very difficult to remove burs of the surface, where one could not see and touch, or the inside of the minute parts made of non-magnetic material of aluminum alloy, hereinafter alumi is used instead of aluminum, like a HDD carriage. Alumi parts have been made by die-cast forming, extrusion molding, or drawing. Die-cast forming has been used only for low quality parts because a nest has been made easily although it has been difficult for a bur to be made. Therefore, the processing method for cutting a block formed by extrusion molding or drawing has been employed for the parts, which have required high processing precision of micron order as seen in a magnetic head carriage of a hard disc drive (HDD) for the computer, although many burs would exist.

This invention relates to the carriage for the hard disc drive polished as final finish with high surface precision of micron order. The purpose of the present invention is to provide the magnetic head carriage in which the finish surface is smooth, a cutting trace does not exist, the surface layer is hardened uniformly by a magnetic material being hit by magnetic power, a cutting bur the edge of which is very tiny does not fall after the hard disc drive is installed, and the carriage for the magnetic head of the hard disc are not influenced by a temperature change and a seasonal change.

The present invention is the carriage of HDD in which a magnetic brush is formed by keeping magnetic abrasive material between magnetic poles and surface polish as final finish is made by magnetic beam processing as magnetic polishing which polishes the surface, removes the burs, and washes the surface of the above described parts by giving vibration or fluctuation by inserting the HDD carriage as an aluminum part being nonmagnetic part in the above described magnetic abrasive brush by forming the magnetic abrasive brush with keeping the magnetic abrasive material between magnetic poles, in the magnetic disc carriage as a head arm member or an access arm of a hard disc drive formed by extrusion molding or drawing.

Here, "magnetic beam processing" means a new polish method in which magnetic power lines which pass through a non-magnetic material, like an X-ray, of a construction are utilized, it is utilized as "magnetic beam processing" to add vibration or fluctuation to magnetic abrasive material which is kept by the difference of the magnetic power lines density between N-S magnetic poles, and a portion located in a special place, where a polishing tool or one's hand cannot reach as seen in the comb inside of comb shape aluminum parts, can be polished.

Here, a generic name of "magnetic abrasive method" has been given to "magnetic beam processing" up to the present, but this name has not expressed the features of the above described technology, thus the new name of "magnetic beam processing" is named in this specification. Further, when "polish" is used accompanying with "burremoval" and/or "wash" in this specification, it means "surface polish" as the narrow meaning different from "bur removal" and/or "wash." The meaning of "polish" as used for "abrasive material," "polishing," "polishing method" in general is used for the wide meaning of "polish" including "bur removal" and/or "wash." Further, the present invention is the magnetic head carriage for the hard disc drive in which it employs feeble magnetism material, the relative magnetic permeability of which is 1.5 to 200, as the above described abrasive material and the surface of the above described carriage by the above described magnetic beam processing is polished as final polish.

Moreover, the present invention is the magnetic head carriage for the hard disc drive in which the surface of the above described carriage is polished as final finish by the above described magnetic beam processing using stainless steel, nickel alloy, or iron alloy having the same hardness as the above described stainless steel as the above described abrasive material.

Further, the present invention is the magnetic head carriage for the hard disc drive in which a pin is used as the above described abrasive material, the shape of which is cylindrical, or the section of which is a polygon pillar, and the surface of the above described carriage is polished as final finish by the above described magnetic beam processing.

Further, the present invention is the magnetic head carriage for the hard disc drive in which a pin, the diameter of which is 0.1 to 1.5 mm, the length of which is 0.1 to 1.5 mm, the shape of which is cylindrical, or the section of which is the polygon pillar, and the length of which is 0.1 to 1.5 mm, is used and the surface of the above described carriage is polished as final finish by the above described magnetic beam processing.

Here, the present invention utilizes the magnetic abrasive material made by mixing different kinds of abrasive materials, each size of which is different respectively and the surface of the above described carriage is polished as final finish by the above described magnetic beam processing.

BRIEF DESCRIPTION OF THE DRAWINGS

The above object and features of the present invention will be more apparent from the following description of the preferred embodiments with reference to the accompanying drawings wherein:

FIG. 4A is a magnetic brush for removing rough burs as final polish stage of the carriage;

FIG. 4B is the magnetic brush for removing rough burs as final polish stage of the carriage;

FIG. 4C is the magnetic brush for removing rough burs as final polish stage of the carriage;

DETAILED DESCRIPTION OF THE INVENTION

The present invention is explained hereinafter using figures.

Figure 1:
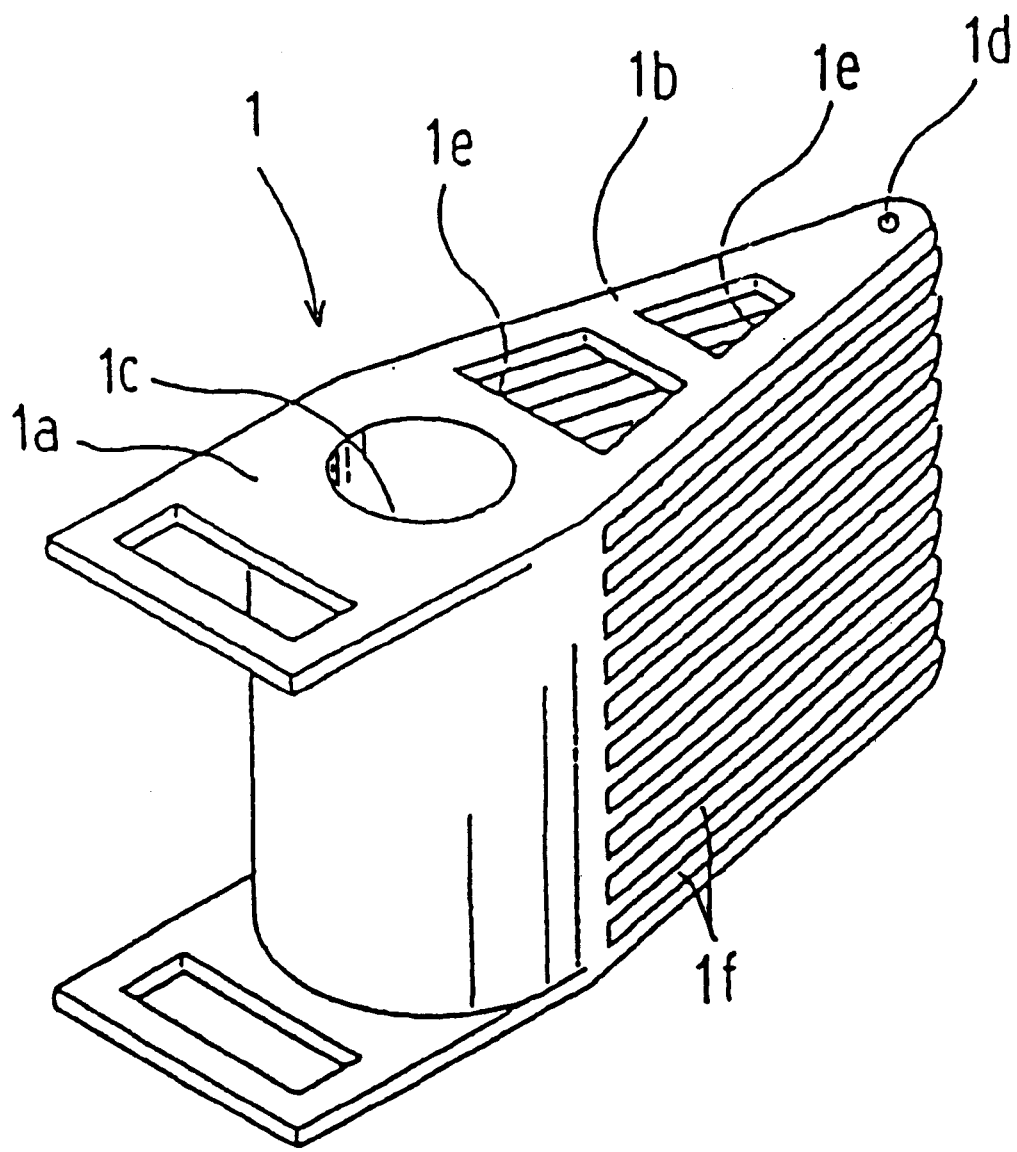
FIG. 1 is the general view of a carriage as a head arm member of a hard disk drive (HDD) of a computer for the magnetic beam processing polish of the present invention.
Figure 2A:
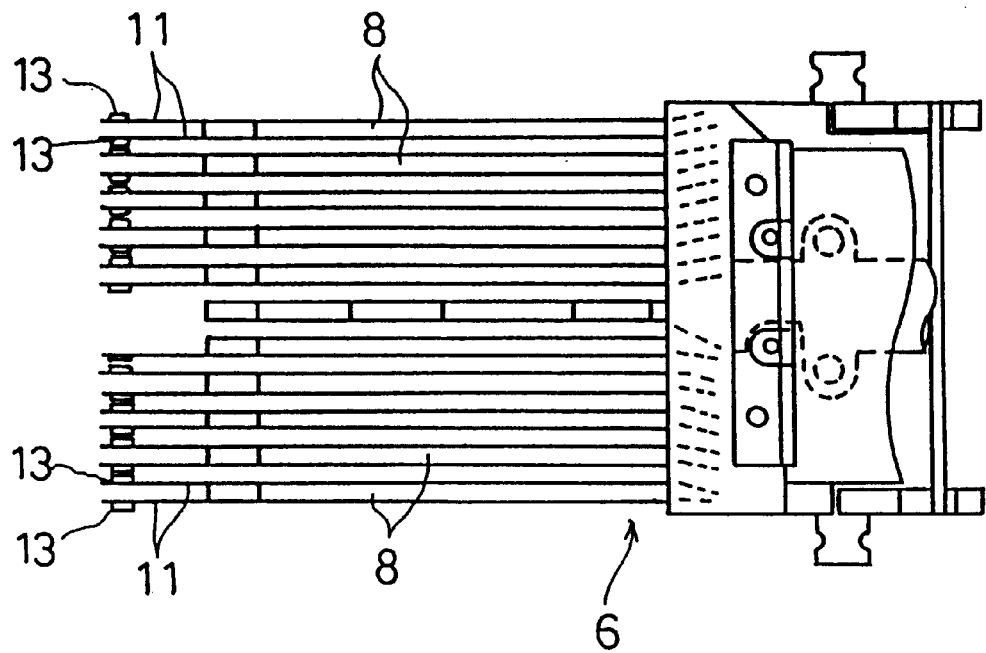
FIG. 2A illustrates a general view for explaining a general composition for a head arm portion of a magnetic disc assembly.
Figure 2B:
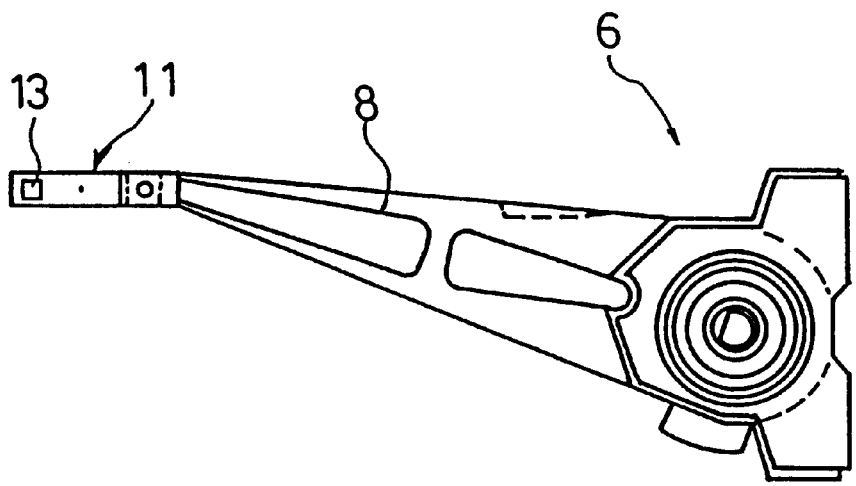
FIG. 2B illustrates the general view for explaining the general composition for the head arm portion of the magnetic disc assembly.
Figure 3:
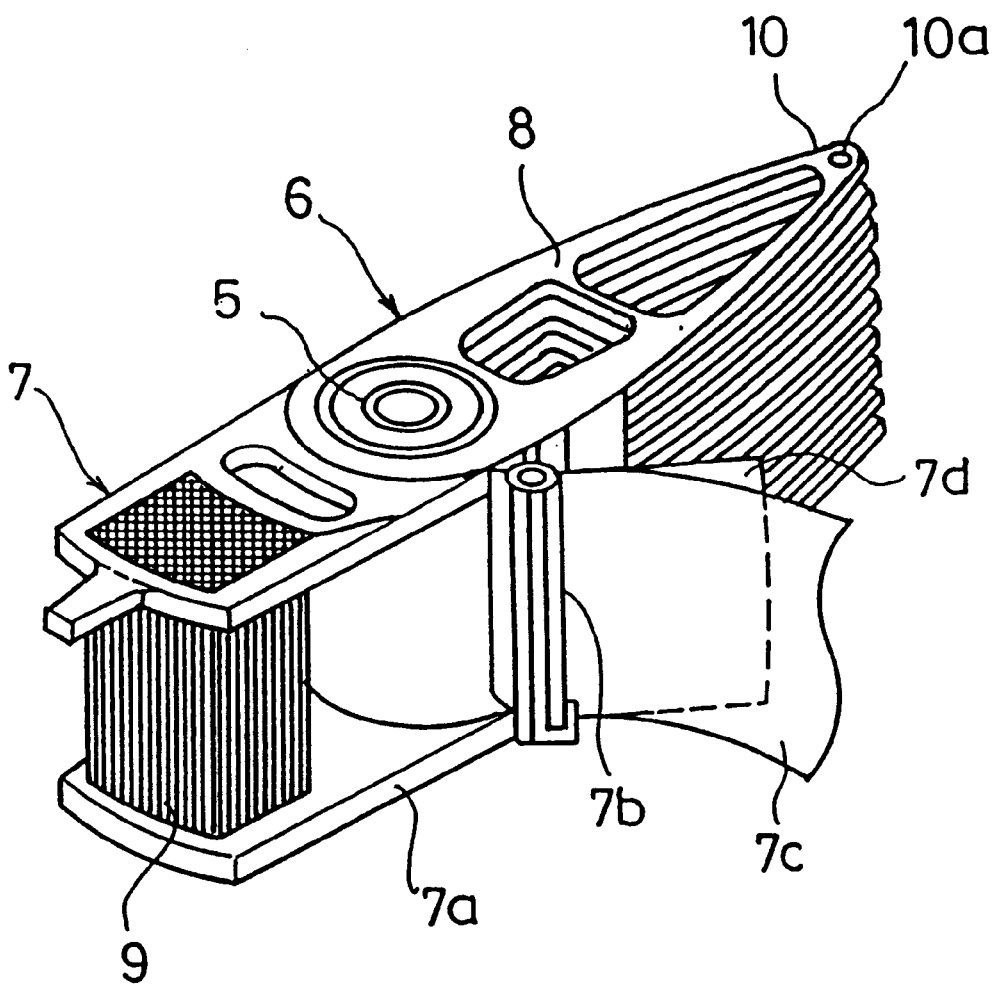
FIG. 3 illustrates the general view for the general composition for the head arm portion of the magnetic disc assembly.
Figure 10A:
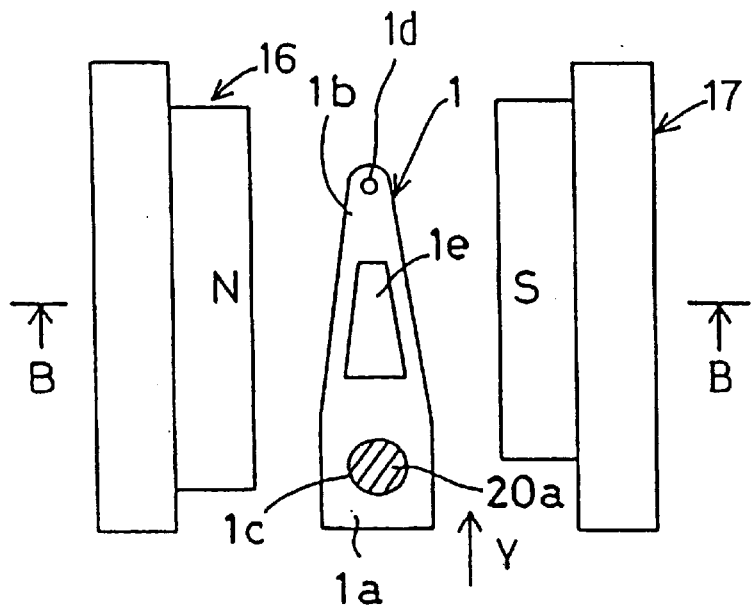
FIG. 10A illustrates a processing method using magnetic beam processing as magnetic polishing in order to form the carriage of the present invention.

FIGS. 10A, 10B, 11A, 11B, 11C, and 11D illustrate a processing method using a magnetic processing apparatus for structuring a carriage of the present invention proposed specially by the present inventor. FIG. 10A is a plane view. FIGS. 10B, 11A, 11B, 11C, and 11D are cross sections viewed from an arrow direction along with a B—B line. The present embodiment is one example for polishing and removing a bur of the carriage 1 as a head arm member of a hard disc shown in FIG. 1. As explained before, in FIG. 1, a work 1 includes a work base member 1a and a plurality of plate members 1b as arm members formed in the comb shape extending parallel from the base member 1a. A number of slits if are formed among the plate members 1b. A supporting shaft hole 1c supporting the work 1 is provided in the base member 1a. A head installation hole 1d for installing a magnetic head and an opening 1e for decreasing the weight of the plate members 1b are provided by cutting work in the top position of each plate member 1b formed in the triangle shape.

New processing method, in which processing inside a narrow slit is possible with keeping magnetic pins functioning processing applying magnetic fields locally unequal in the space, is proposed by the above described processing method using a magnetic beam processing apparatus. Namely, although usual brush finish work needs a special condition that a brush should be fixed to the base, the brush of the present processing method includes the magnetic pins which are flexible pin brushes formed along with the magnetic field direction, so the brushes can be identified appropriately for the insertion of nonmagnetic construction and the finish work and bur removal work in the narrow space, in which the magnetic fields are held in the processing space, are made. This is the most suitable to the non-sturdy carriage construction. When the construction is carried out, the above described pins are gathered automatically and returns to the original magnetic pin brushes condition.

The processing is made as follows.

Figure 10B:
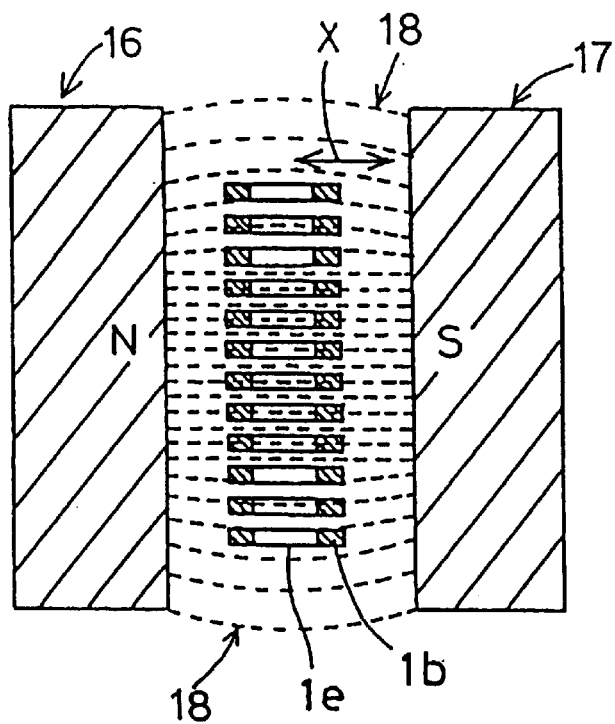
FIG. 10B illustrates the processing method using magnetic beam processing as magnetic polishing in order to form the carriage of the present invention.

As shown in FIG. 10A, a magnetic pole (N) 16 and a magnetic pole (S) 17 are arranged oppositely, then magnetic abrasive material is inserted in the space between the magnetic pole (N) 16 and the magnetic pole (S) 17. Feeble magnetism with suitable strength is used as the abrasive material. Although the magnetic material should be used as abrasive material since the above described abrasive material should be collected and kept between N pole and S pole of the above described magnet by magnetic force, the magnet with weak magnetic power is preferable for the above described magnetic material. Because, parts would be damaged since too strong power would be applied to parts and too strong holding power would be applied by the magnet if ferromagnetism was used. Further, the hardness of the abrasive material should be suitable for use since too strong hard abrasive material was not suitable because the abrasive material would be stuck into aluminum parts, surface of the parts would be damaged, and the stuck abrasive material would be kept on the parts if the hardness of the abrasive material was too strong. Conversely, the burs would not be removed fully if the hardness of the abrasive material was too weak. As the above described magnetic abrasive material, feeble magnetism with relative magnetic permeability 1.1 to 100, for example, of a polygon pillar or a cylindrical pillar made of stainless ferromagnetism made of 18-8 stainless steel by cold working, for example, with the length of 0.5 to 1.5 mm preferably is used. This material does not damage the surface or stick into the surface of the aluminum parts. By holding the above described magnetic brush with suitable holding power between magnetic poles, the burs removal, polish, and wash can be made on the surface of the work with high precision and efficiency by taking aim at the processing position within the work. Further, it can be prevented that the magnetic abrasive material enters behind the magnetic poles. Moreover, a magnetic brush 18, in which magnetic abrasive materials are arranged between the magnetic pole 16 and the magnetic pole 17 along with magnetic lines as shown in FIG. 10B, is formed.

Figure 11A:
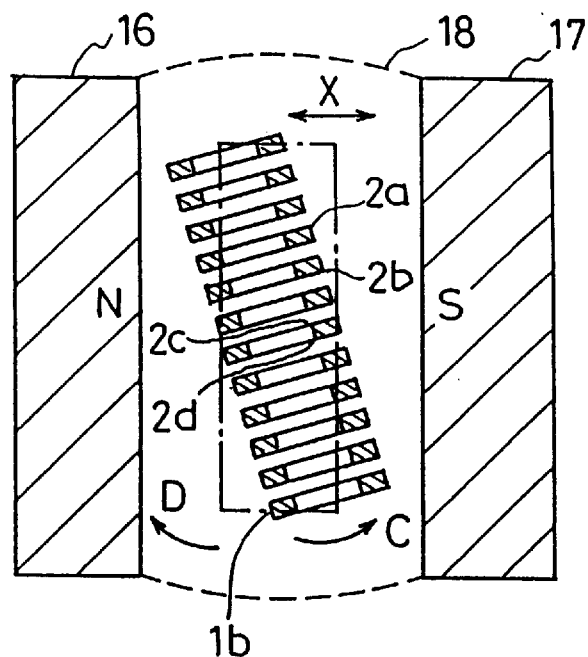
FIG. 11A is the explanatory view to explain another motion of the processing method using magnetic beam processing as magnetic polishing in order to form the carriage of the present invention.
Figure 11B:
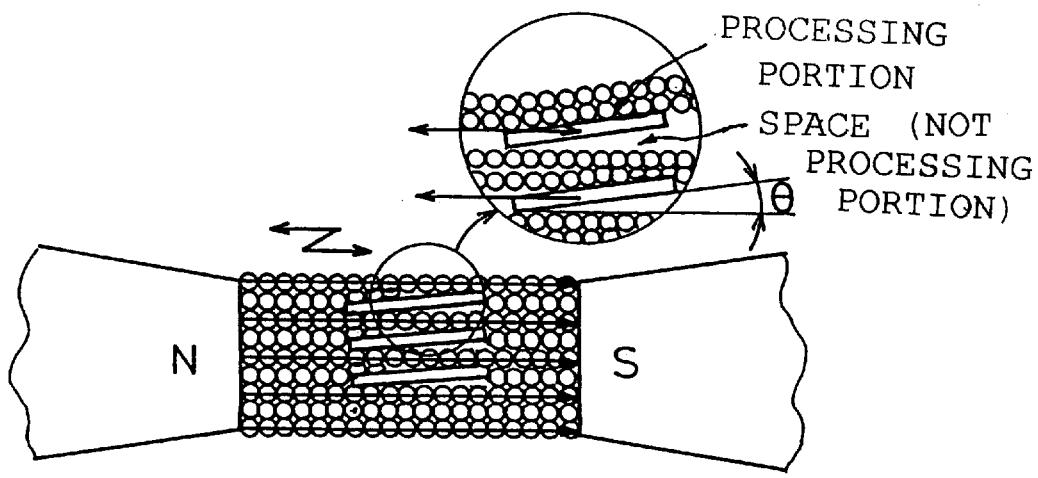
FIG. 11B is the explanatory view to explain another motion of the processing method using magnetic beam processing as magnetic polishing in order to form the carriage of the present invention.
Figure 11C:
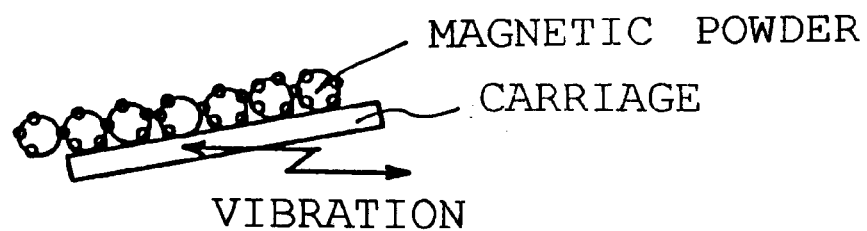
FIG. 11C is the explanatory view to explain another motion of the processing method using magnetic beam processing as magnetic polishing in order to form the carriage of the present invention.
Figure 11D:
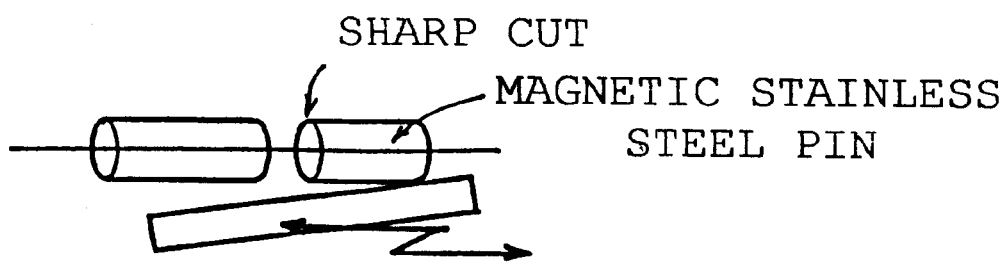
FIG. 11D is the explanatory view to explain another motion of the processing method using magnetic beam processing as magnetic polishing in order to form the carriage of the present invention.

In more detail, as shown in FIG. 11C, usual magnetic particles might be iron powder as magnetic powder with an undecided notched shape. In the case of the carriage used for the hard disc drive for the present invention to be produced, there is severe condition that magnetic powder or abrasive material should not remain definitely after processing when the burs are removed. To satisfy this severe condition, the above described abrasive material should not have the notched surface shape of the tiny particles tending to remain with sticking on the surface of the construction. As the abrasive material which can process the carriage, there is a magnetic pin with a sharp edge and a pin shape proposed specially by the applicant of the present invention. The magnetic pin does not contain remaining particles, still a fragment of the cutting edge of the pin turns to one direction at all times, processes, and works. Stainless steel is chosen as the magnetic pin in order for the construction to maintain the rustproof condition. The length and the value of the magnetic stainless steel are extremely important because they relate to the magnetic power based on unequal magnetic field. The edge, which is sharp and does not drop even if the processing pressure is given, is selected as the edge of the pin, and a cut-wire is enough used as the pin edge.

Further, for removing big burs by the edge fragment formed in the magnetic pin, it is required that the sharpness of the pin edge fragment be improved. Adding high frequency vibration harmoniously is desirable in order to improve the sharpness. Namely, it is highly recommended that big mutual frequency vibration and minute high frequency vibration are added effectively between the construction and the magnets and thus frequency adding effect is utilized. Further, it is expected that the mutual vibration movement between the above described construction and the magnets should be not one direction and one dimensional but ellipse causing cross effect of processing traces. Because, the above described cross effect improves bur removal efficiency and smoothes a surface rapidly.

When nonmagnetic material is discussed for processing, lines of magnetic force permeate the construction freely and cause the magnetic force as processing force to the above described magnetic abrasive material. The phenomenon that the lines of magnetic force permeate the material has the same meaning as the phenomenon that X-rays permeate the material, namely, that places beyond one's reach or sight can be processed effectively. Therefore, the above described magnetic processing enables the surface finish and the bur removal of the edge by applying processing power of the above described magnetic abrasive material to a spot beyond one's reach or sight.

Figure 12:
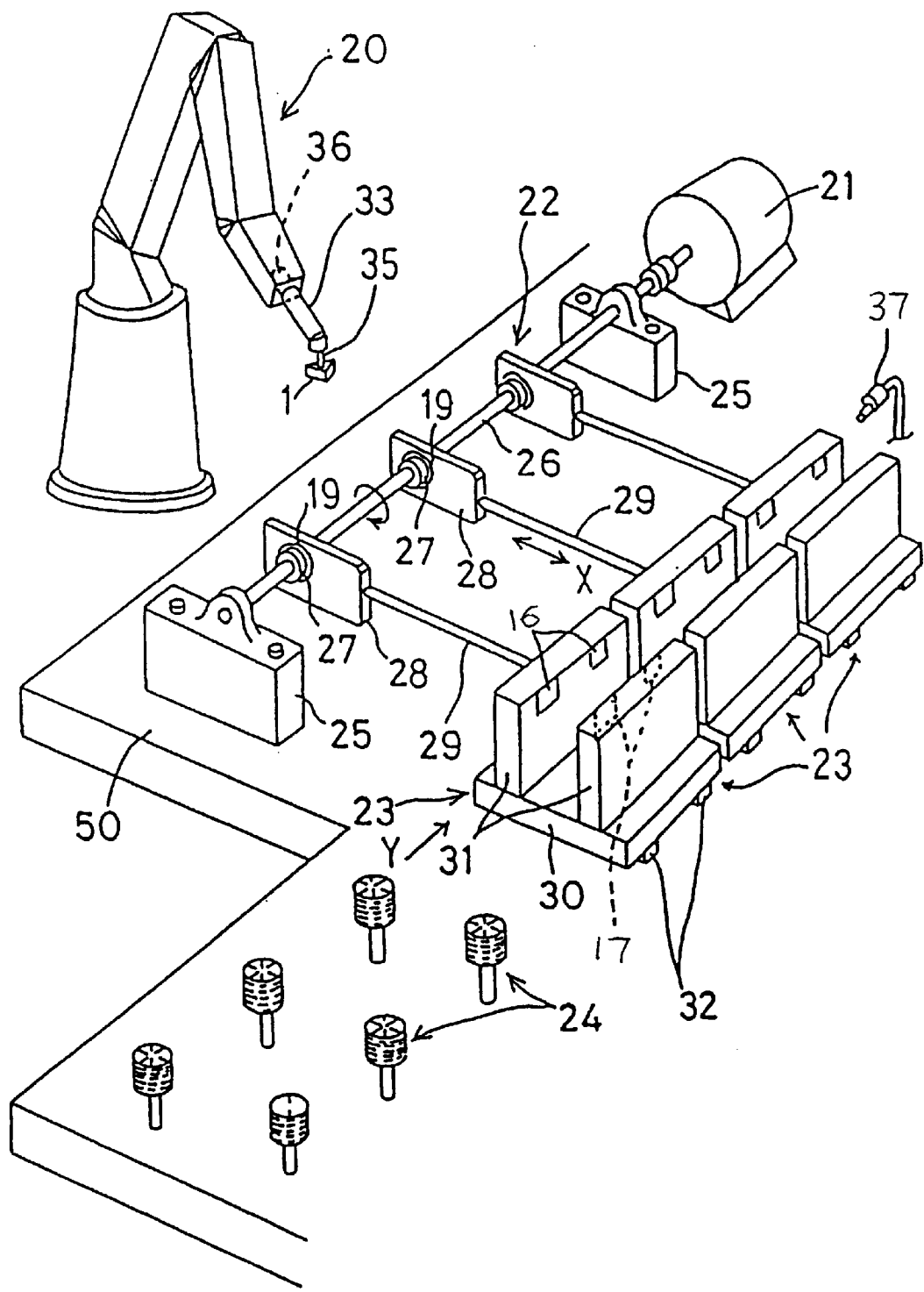
FIG. 12 is the general view of magnetic beam processing as magnetic polishing applied in the present invention.

FIG. 12 illustrates magnetic beam processing view for magnetic polishing of the present invention. The work 1 as the hard disc carriage is rough finished by a group of nylon brushes 24 containing rough polish grind particles or metal brushes of FIGS. 4A, 4B, and 4C at first. Here, for the carriage, right and left sides of each plate member 1b are polished. Next, in the work 1, a support arm 20a of robot is inserted in the support shaft hole 1c shown in FIGS. 10A and 10B, a pointed end of the plate member 1b of the work 1 is inserted horizontally from Y direction between the magnetic pole (N) 16 and magnetic pole (S) 17 by the robot firmly supporting it, and the work 1 is inserted in the magnetic brush 18 and kept vertically in the middle position between magnetic pole (N) 16 and magnetic pole (S) 17. The reason why the pointed end of the plate member 1b of the work 1 is inserted from Y direction between the magnetic pole (N) 16 and the magnetic pole (S) 17 is because the width between magnetic pole (N) 16 and the magnetic pole (S) 17 should be wide and therefore the magnetic fields between the magnetic pole (N) 16 and the magnetic pole (S) 17 are not utilized effectively, if the side wall of the plate member 1b is inserted.

Figure 13:
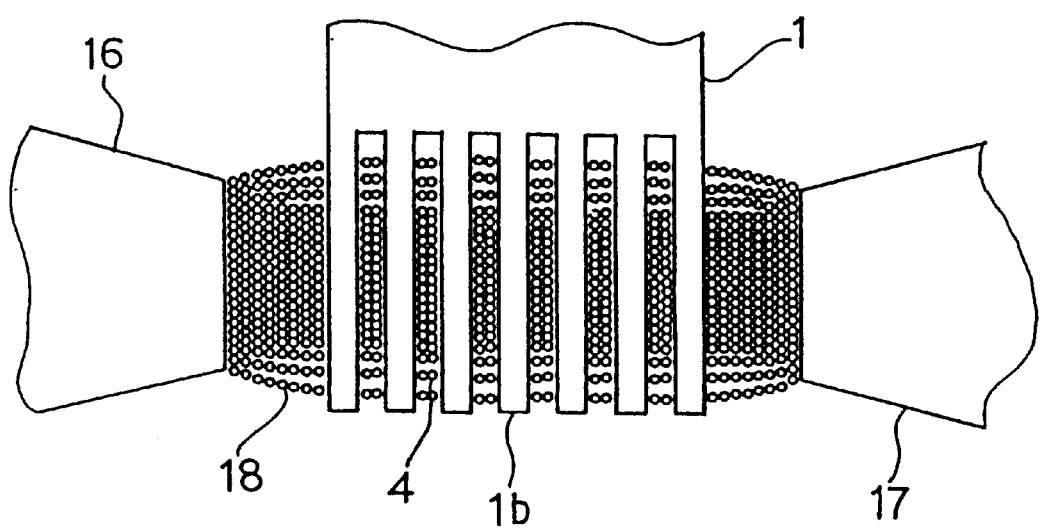
FIG. 13 illustrates the head arm member of the hard disc drive (HDD) as one research example of the present invention.

The work 1 is inserted in such a way that the magnetic abrasive materials are jostled through the way. The magnetic abrasive materials are magnetized and kept along with the magnetic beams between the N pole and the S pole, so they are rearranged along with the magnetic beams through which the above described magnetic abrasive materials pass after the work 1 has been inserted. Therefore, they are kept between the magnetic poles in such a way that they are inserted between the gaps 4 of the work 1 as shown in FIG. 13. Here, FIG. 13 is an explanatory view for easily showing the state of the magnetic abrasive material. In the actual application, the insertion way shown in FIG. 13 is not used because the precision, 20 μm as the width between the teeth of the comb, is destroyed by the deflection by processing if the teeth of the comb are made a right angle with the lines of the magnetic force. Accordingly, the insertion way, in which the teeth of the comb are made parallel with the lines of the magnetic force, of FIGS. 10A, 10B, and 11A is used.

Thus, "the magnetic abrasive brush floated in the space" is formed in the teeth of the comb of the work 1 by the beams by the lines of the magnetic force. Then, vibration, X direction stroke of which is 7 mm, Y direction stroke of which is 1 mm, Z direction stroke of which is 1 mm, and frequency of which is 40 Hz, is added between the magnet poles 16 and 17. The above described vibration is yielded by non-circle crank, so vibration elements are yielded in the vertical direction of FIGS. 10A and 10B and then elliptic movement is yielded. Vibration is yielded by not only mechanical generation means using the non-circle crank, but also electrical means. For polish as explained in the later part of the specification, however, it is much more effective for polish efficiency and smoothing processing that polish is made in the vertical direction of FIGS. 10A and 10B as well since magnetic abrasive brushes are made in all the directions.

If the vibration is added to the magnetic poles 16 and 17 in X, Y, and Z directions with the position of FIG. 10B, the magnetic brush 18 vibrates as well in X, Y, and Z directions, the magnetic abrasive materials contact and vibrate for the work 1, and then polish is made in an angle area formed in an outer edge of the plate member 1b and the surfaces of right and back sides of the plate member 1b mainly. Although this way is capable of being applied to polish the surfaces of a plurality of plate members 1b of the work 1 mainly, the following way is made for polish when the burs in angle areas of deep positions inside the plate members 1b of the work 1 especially are removed with a high precision. First, the magnetic poles 16 and 17 are vibrated in the horizontal and vertical directions in FIG. 10B, after predetermined time has passed, the work 1 is declined at an angle of about 15 degrees in the counterclockwise direction, "C" direction, as shown in FIGS. 11A, 11B, 11C, and 11D as the axis of the work 1 is a line extending in the insertion direction of the work 1, vertical and horizontal vibrations are added while this position is kept, and processing is made as shown in the above explanation. Time for processing step for vertical position shown by alternate long and short dash lines in FIG. 11A and for the present declined position is determined properly based on the required standard for processing for an angle and the shape of the work1 respectively. Moreover, after processing for the declined position, shown in FIGS. 11A, 11B, 11C, and 11C, is made for the predetermined time, like the same way as the above, the work 1 is declined at an angle of about 15 degrees in the clockwise direction, "D" direction, as shown in FIGS. 11A, 11B, 11C, and 11D as the axis of the work 1 is a line extending in the insertion direction of the work 1, vertical and horizontal vibrations are added while this position is kept, and processing is made as shown in the above explanation.

FIG. 11B is a view showing a processing state. The surface of the construction facing the abrasive material to be pressed is polished although it depends on the declining direction. Declining angle θ is an important factor in this processing method in order to determine a collision angle at which the abrasive material and the construction collide. If θ is too large, although the power of the abrasive material by which the surface of the construction is polished increases and the processing power of the abrasive material increases, the precision of the shape of the slit construction made of weak material becomes bad and exceeds the permissible value. This relates to the magnitude of vibration amplitude, so the most suitable value is decided after a lot of trial and error.

In the plate member 1b of the work 1, two angle members 2a and 2b formed in surround edges of the plate members 1b and two angle members 2c and 2d formed in the inner surround edge of the opening 1e are provided. In the position of FIG. 10B, the burs projecting toward other plate member from the face inside the plate member 1b, namely toward the direction crossing to the surface of the plate member 1b, can be removed. But, it is very difficult to remove the burs projecting from surround edge outside a plate 2 and the burs projecting toward the inside from the inner surround edge of the opening 1e, namely toward the direction parallel with the surface of the plate member 1b.

In the processing for the position of FIGS. 11A, 11B, 11C, and 11D, the magnetic brush 18 arranged in the magnetic lines direction contacts with the angle members 2a and 2b. Then, the bur projecting outside from the surrounding edge of the angle member 2a and the bur projecting inside from the inside surrounding edge can be removed. Further, it is possible to process the angle members 2a and 2b in the designated shape, in other words, it is possible to plane off the edges of the angle members. Moreover, in the condition in which the work 1 is declined reversely in the "D" direction, in FIGS. 11A, 11B, 11C, and 11D, the chain of the magnetic abrasive material contacts with angle members 2c and 2d. Then, it is possible to remove the burs projecting outside from the outer surrounding edge of the angle member 2b and the burs projecting inside from the outer surrounding edge of the angle member 2c. Moreover, the angle members 2b and 2c can be processed in the designated shape.

The work 1 is non-magnetism, so the lines of magnetic power are capable of passing freely through the work 1 if the work 1 is declined. Thus, the processing can be made at once for the number of angle members formed on the surface of the minute parts having complex three dimensional structure, and the processing is very easily made including automatic processing. Especially, the abrasive processing is made very well for such portions as holes and openings inside the work 1. For example, the quality and the performance of the hard disc can be improved, and the manufacturing processing cost can be reduced.

FIG. 13 is another example of the processing method. In this case, the surface of the plate member 1b of the work 1 meets with the magnetic lines direction at almost right angles. The lines of magnetic power permeate through the work 1 made of non-magnetic material, so the condition of the magnetic brush 5 which is kept along with the lines of the magnetic power remains the same condition if the plate member 1b of the work 1 is inserted in the magnetic brush 18 which is kept in the magnetic fields between the magnetic poles 17 and 18. The abrasive materials contained in the magnetic brush permeate the gaps among plate members 1b and are rearranged in the almost original condition. The surfaces of the plate member 1b are rubbed by the magnetic abrasive materials when the magnetic poles 16 and 17 are vibrated in the parallel direction with the surface of plate member 1b and the work 1 is declined as explained in the above description. Thus, the surfaces and the angle portions of the plate members 1b can be polished. Here, the magnetic abrasive materials contact with the surfaces of the plate members 1b with the predetermined pressure according to the magnetic power condition in the position of the magnetic abrasive materials, then polish is made by this processing pressure. The magnetic power applied to the magnetic materials in the magnetic fields is expressed by the following numerical formula, $$Fx = kD^3 \chi H (\delta H / \delta x) \quad (1)$$

where, Fx is stress in the x direction, k is a constant, D is a particle diameter, $\chi$ is a magnetization rate of the particle, H is a magnetic field strength, ($\delta H/\delta x$) is a changing rate of the magnetic field strength in the x direction. According to this expression, the magnetization power applied to the magnetic material in the x direction is in proportion to the particle diameter cubed, the magnetization rate of the magnetic material, magnetic field strength, and the changing rate of the magnetic field strength in the x direction.

Again, we go back to FIG. 12 of the whole schematic view showing the preferred embodiment of the magnetic beam processing apparatus employed by the present invention. In FIG. 12, the magnetic beam processing apparatus of the present invention generally includes a robot 20, an electric motor 21 set on a frame 50, a vibration generation apparatus 22, a plurality of magnetic units 23, for example, three magnetic units 23 in this figure, and a group of metal or nylon brushes 24 containing abrasive particles for rough polish. The above described vibration generation apparatus 22 includes a shaft bearing 25 fixed to the frame 50, a rotary shaft 26 connected to the electric motor 21 and supported freely rotating way among the shaft bearings 25, the rotary shaft 26 connected to the electric motor 21, a moving plate 28 set to a decentering cam 27 through a bearing 19, and a sliding rod 29 connected to the moving plate 28, and thus a rotation of the rotary shaft 26 is converted to the back and forth movement of the sliding rod 29 by the decentering cam 27. Here, although the vibration generation apparatus 22 is driven by the electric motor 21 according to the present invention, it can be driven by an oil hydraulics cylinder, an air cylinder, or an electrical cylinder.

The above described each magnetic unit 23 includes a base 30, a pair of magnetic pole support materials 31 set facing with each other, magnetic poles 16, for example "N" poles, and 17, for example "S" poles, the poles of which are opposite with each other set in the magnetic pole support material 31 facing with each other. The base 30 is set freely sliding way on rails 32 installed on the frame 50 and connected to each sliding rod 29, then the magnetic unit 23 is vibrated. The magnetic abrasive materials composed of pins made of feeble magnetism materials are inserted between the magnetic poles 16 and 17, thus the magnetic brush made of feeble magnetism materials, in which the magnetic abrasive materials are arranged along with the lines of magnetic power between the magnetic poles 16 and 17, is made up. Further, a liquid jet nozzle 37, which is installed for each magnet unit although only one liquid jet nozzle 37 is shown in FIG. 12, for processing or washing suitably is installed in the upper part of the magnetic unit 23, oil or liquid is jetted in the magnetic unit 23, and the polished chips are removed from the magnetic brush.

A work hold finger 35 is installed rotary way in a rotary arm 33 of the above described robot 20, and the work 1 can be installed and held in the work hold finger 35 in such a way that it can be put on and taken off. A vibration apparatus 36 based on ultrasonic waves or high frequency waves is installed in the base of the rotary arm 33. Although only one robot 20 is shown in FIG. 12, a plurality of robots 20 the number of which is equal to the number of the magnetic units are installed around the magnetic units 23. Here, the robot is not always installed in the above described apparatus, but a hold apparatus to hold the work 1 may be employed in such a way that it can be put on and taken off.

The magnetic beam processing employed in the present invention is used as a washing method for the above described aluminum parts as well. For example, when an adhesive agent is used in the parts production stage and then a stuck unnecessary adhesive agent is removed, the surface precision, micron precision, may be broken because the surface is melted. Further, mechanical effects are not added, so enough wash effects are not expected. In such a case, the magnetic beam processing can be employed for a surface wash of the parts, and the magnetic abrasive materials of the present invention can be used as the wash means. In this case, mechanical effects can be applied on the parts surface by magnetic power, and wash effects can be improved by adding the mechanical power to the wash power by wash liquid.

Figure 5:
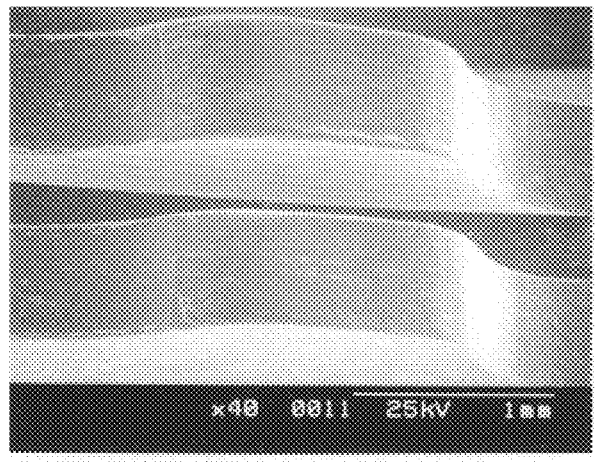
FIG. 5 is the picture of a surface of the carriage after burs removal finish is made by conventional manual polishing.
Figure 5:
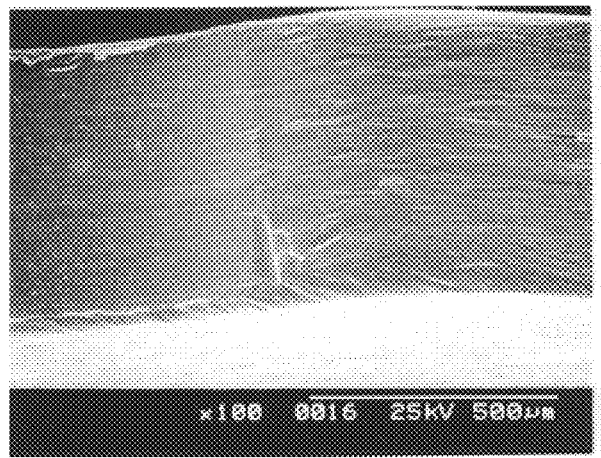
Figure 5:
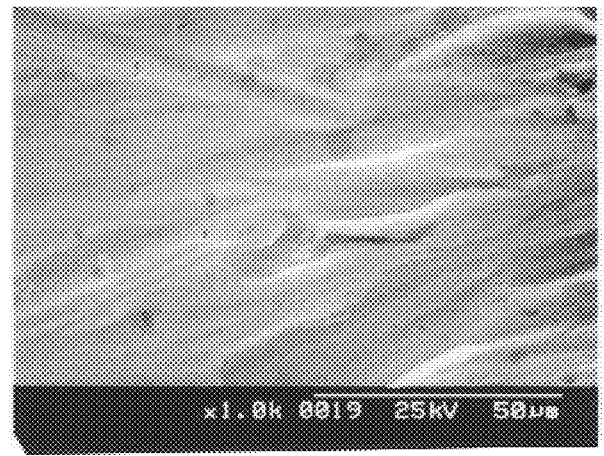
Figure 6:
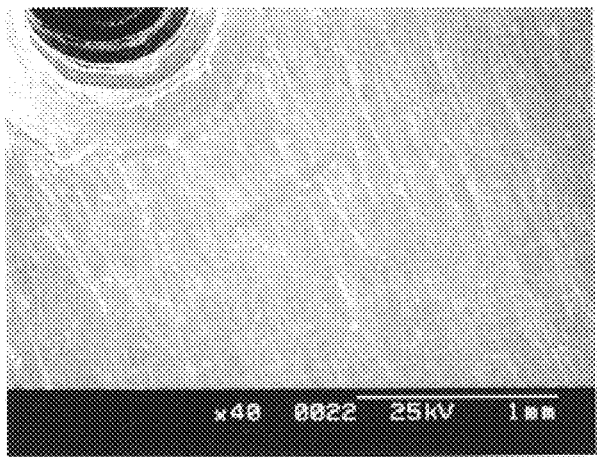
FIG. 6 is the other picture of a surface of the carriage after burs removal finish is made by conventional manual polishing.
Figure 6:
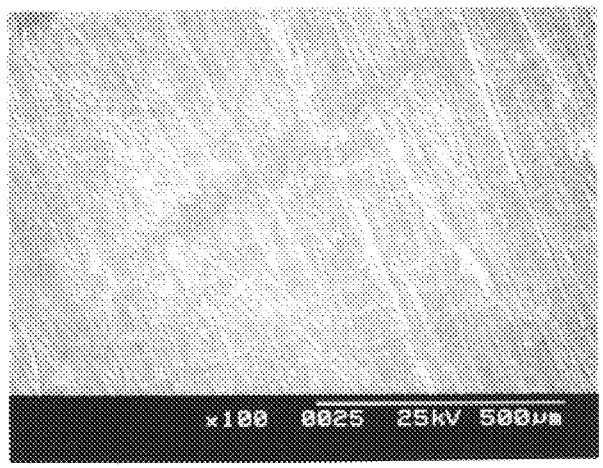
Figure 6:
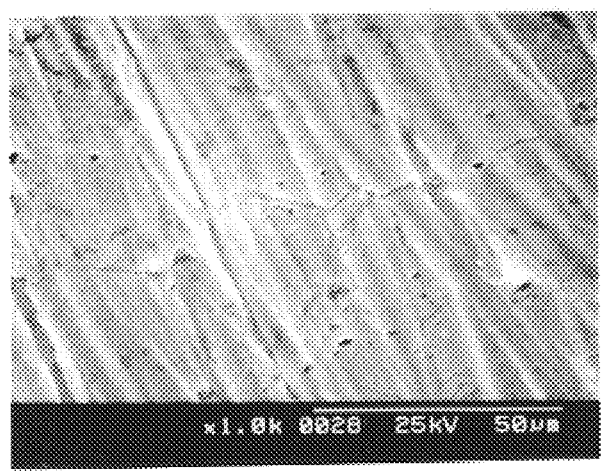
Figure 7:
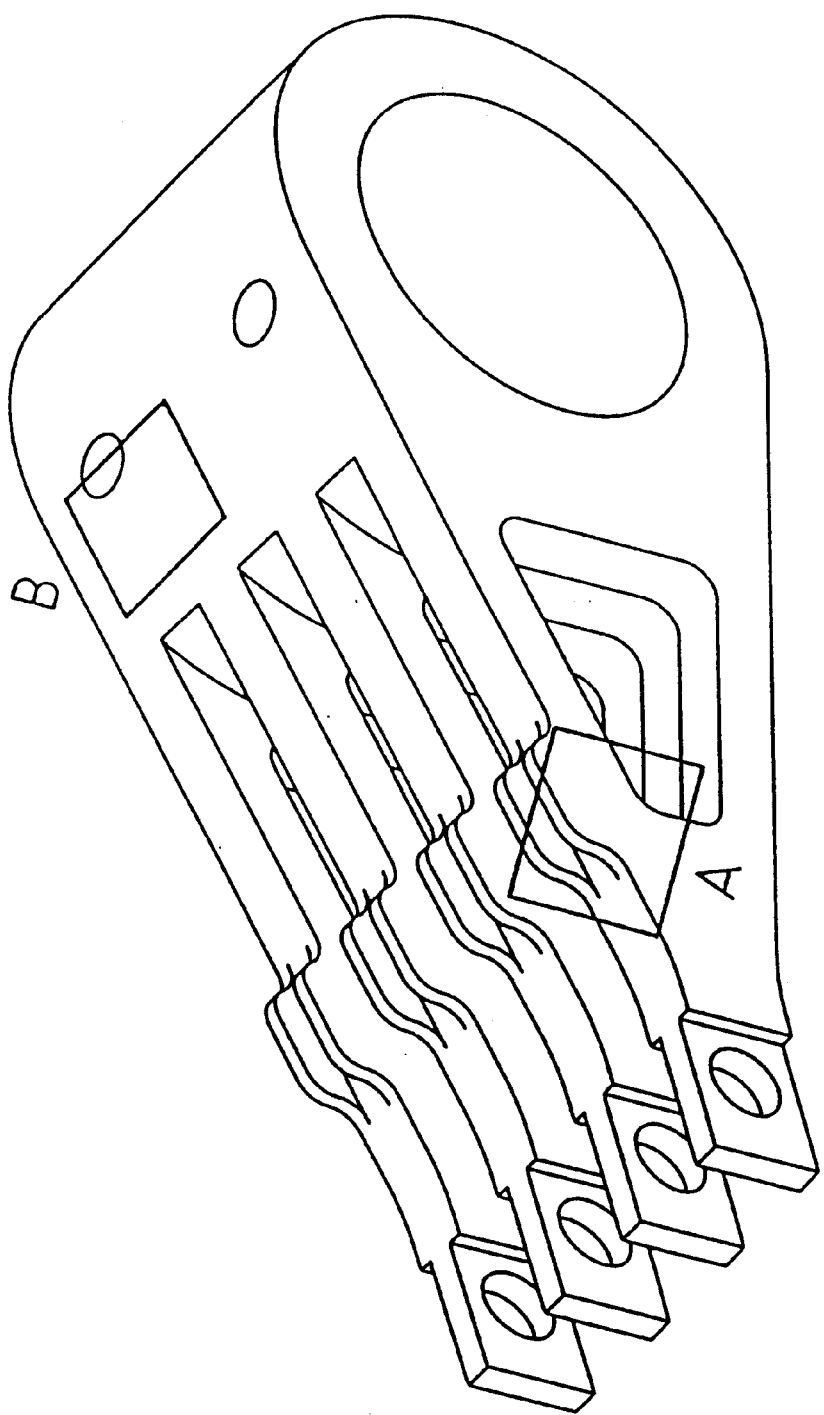
FIG. 7 illustrates a spot pictured in FIGS. 5, 8, 9, 6, 14, and 15.
Figure 8:
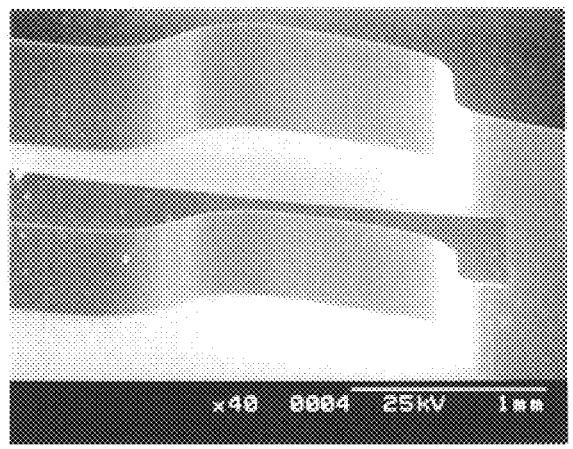
FIG. 8 is the picture of the surface of the carriage after burs removal finish is made by electrolytic polishing.
Figure 8:
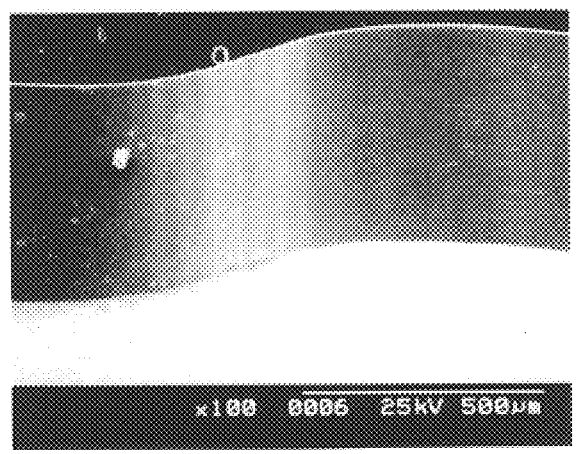
Figure 8:
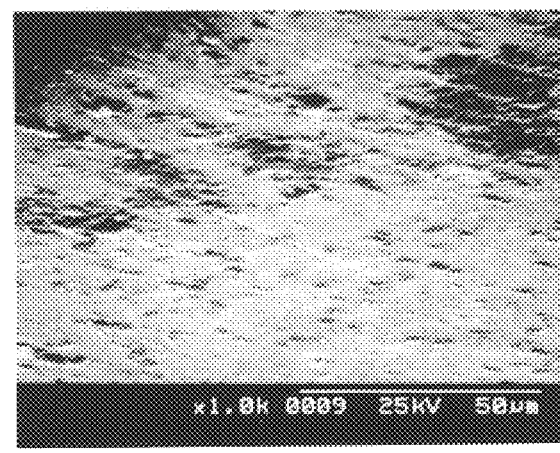
Figure 9:
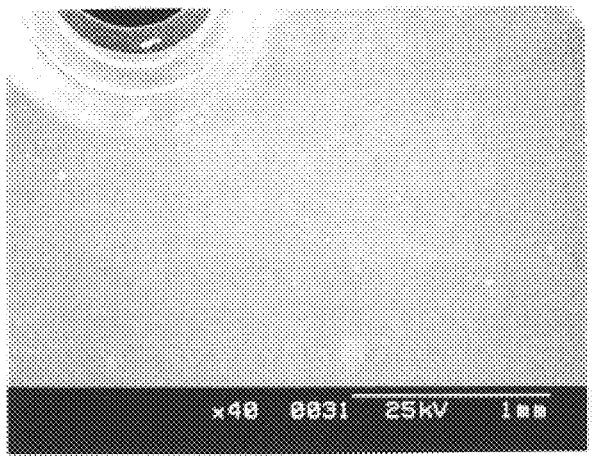
FIG. 9 is the other picture of the surface of the carriage after burs removal finish is made by electrolytic polishing.
Figure 9:
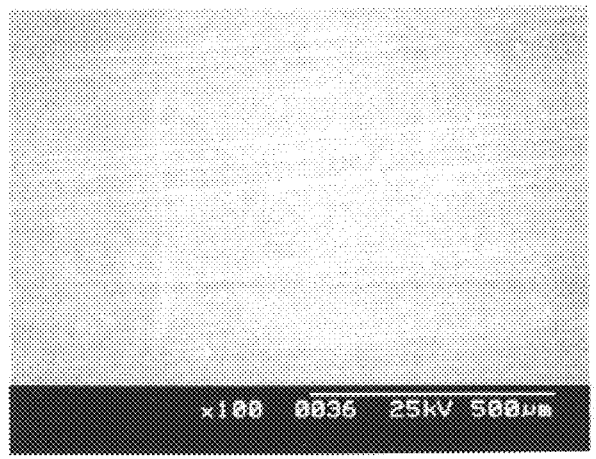
Figure 9:
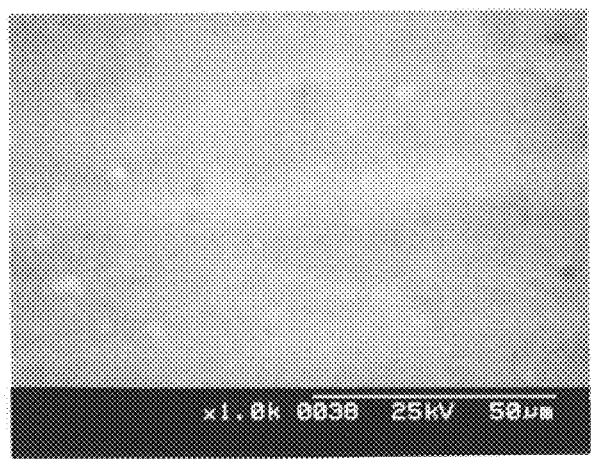
Figure 14:
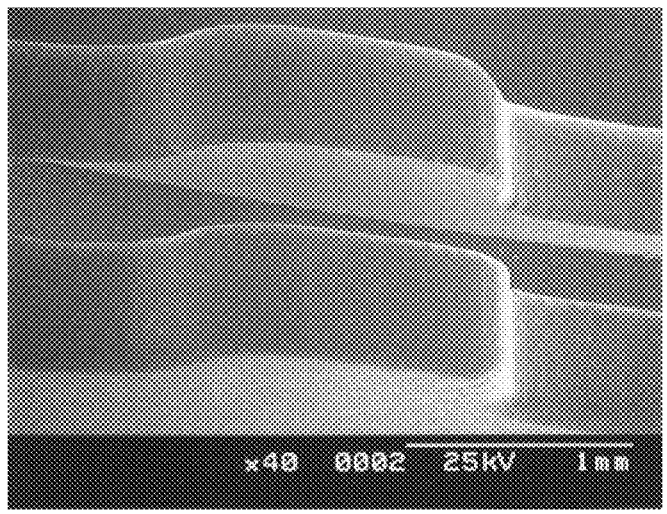
FIG. 14 is the picture of the surface of the carriage after burs removal finish is made by magnetic beam processing as magnetic polishing of the present invention.
Figure 14:
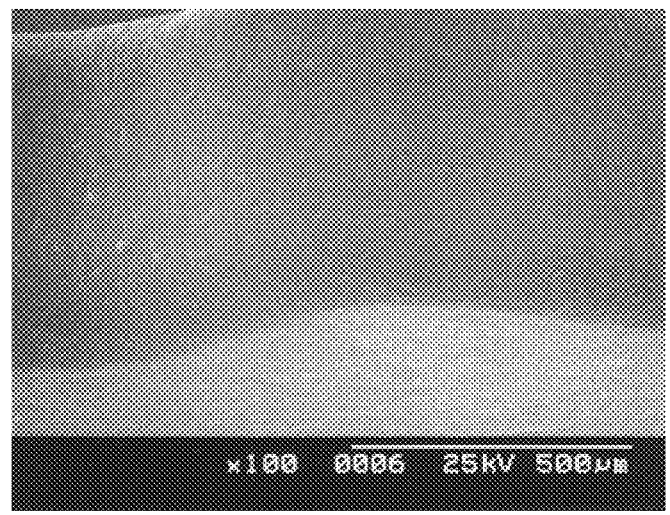
Figure 14:
Figure 15:
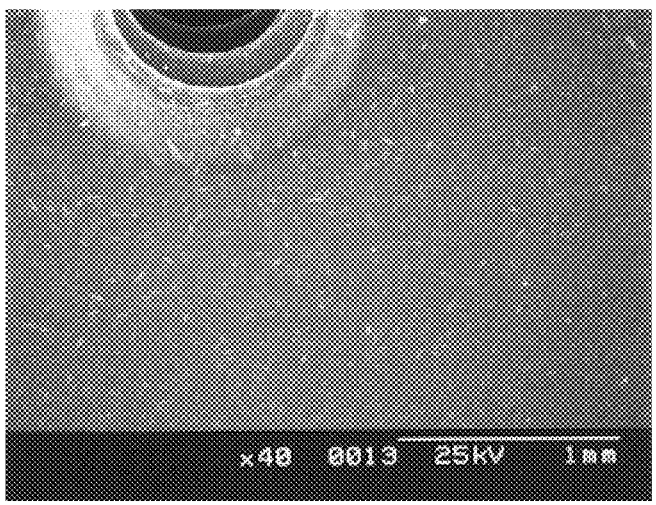
FIG. 15 is the other picture of the surface of the carriage after burs removal finish is made by magnetic beam processing as magnetic polishing of the present invention.
Figure 15:
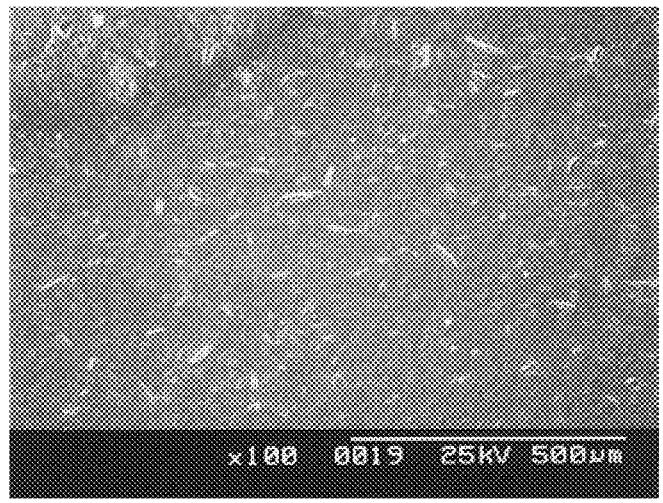
Figure 15:
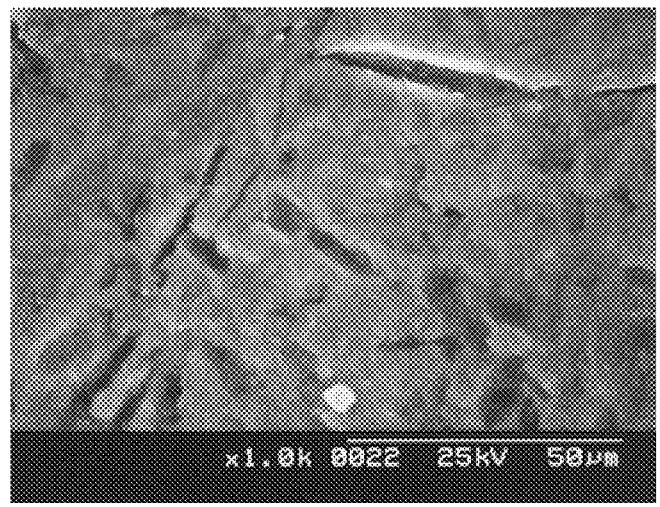
Figure 16:
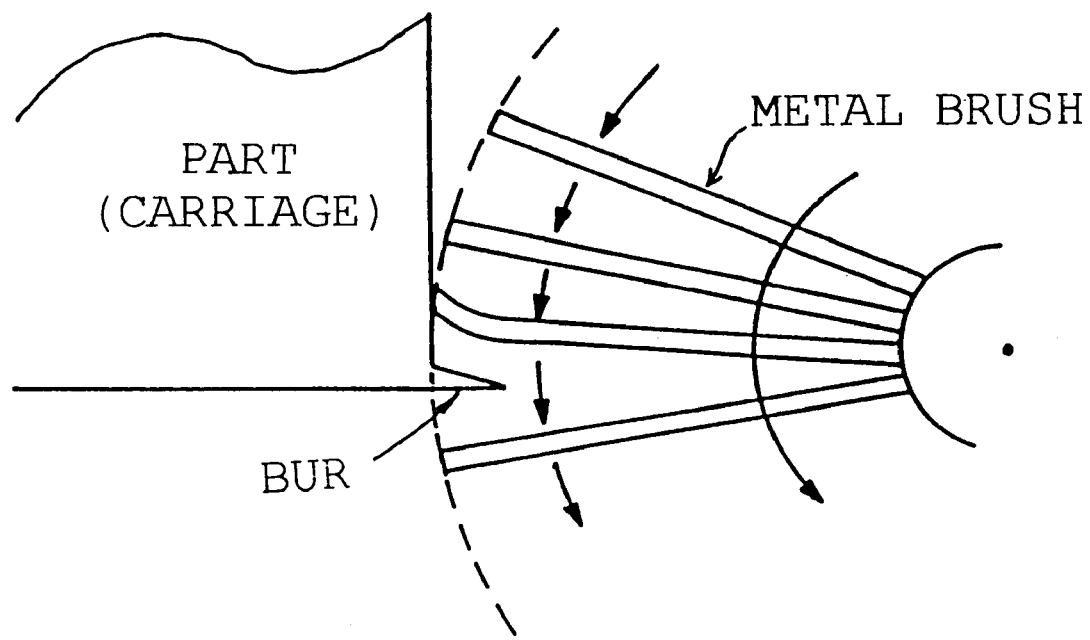
FIG. 16 illustrates the motion of a metal brush used for rough bur removal.
Figure 17A:
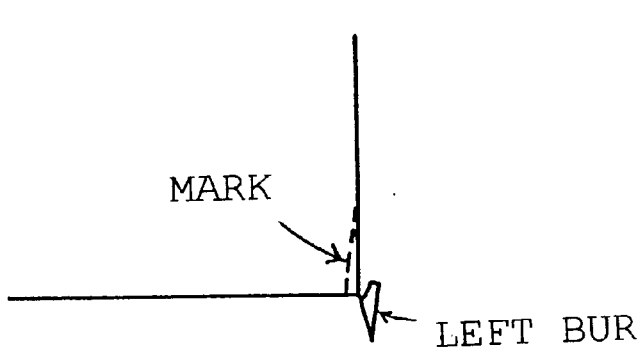
FIG. 17A illustrates the example of polish by a magnetic polishing pin as magnetic abrasive material of the present invention.
Figure 17B:
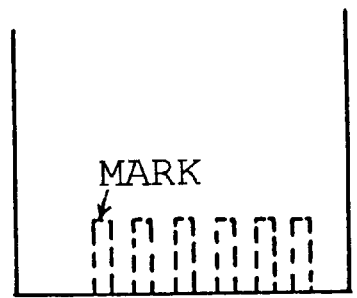
FIG. 17B illustrates the example of polish by the magnetic polishing pin as magnetic abrasive material of the present invention.
Figure 17C:
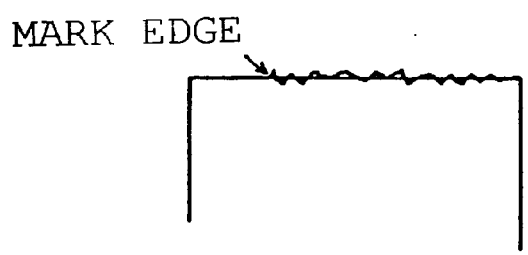
FIG. 17C illustrates the example of polish by the magnetic polishing pin as magnetic abrasive material of the present invention.
Figure 18A:
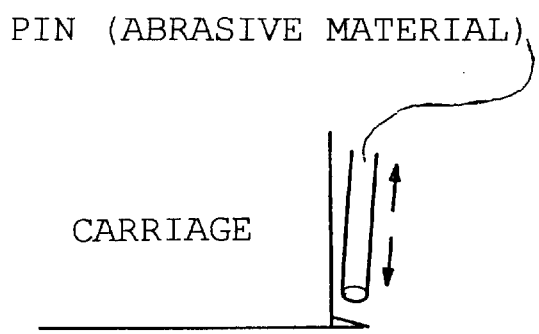
FIG. 18A illustrates the polish process of magnetic beam processing as magnetic polishing of the present invention.
Figure 18B:
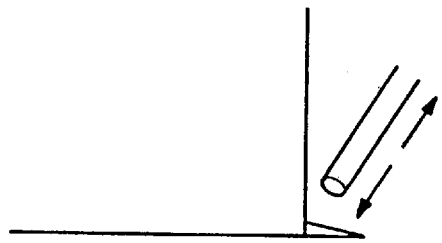
FIG. 18B illustrates the polish process of magnetic beam processing as magnetic polishing of the present invention.
Figure 18C:
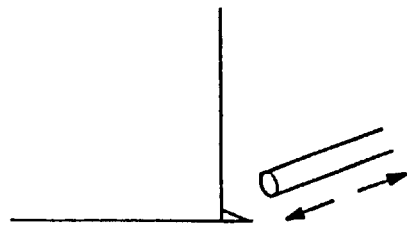
FIG. 18c illustrates the polish process of magnetic beam processing as magnetic polishing of the present invention.
Figure 18D:
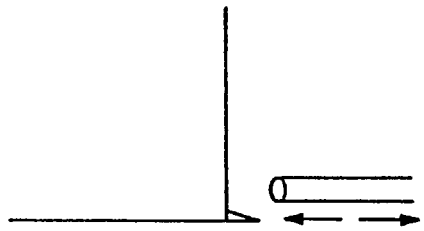
FIG. 18D illustrates the polish process of magnetic beam processing as magnetic polishing of the present invention.

FIGS. 14 and 15 are pictures of the carriage finish surface polished by the magnetic beam processing employed by the present invention. Here, FIG. 14 is an enlarged picture of the part of "A" of FIG. 7. FIG. 15 is an enlarged picture of the part of "B" of FIG. 7. The magnitude rate for the figures becomes large from the top to the bottom. Compared with the electrolytic polishing of FIGS. 8 and 9, the surface is uneven obviously. Compared with the manual finish polishing of FIGS. 5 and 6, although the surface is uneven slightly, the surface is scarcely notched like stripes traces as seen in FIGS. 5 and 6, but it can be seen obviously that the angle portions are rounded. This is based on the following reason. FIGS. 16 and 17 illustrate rough removal work of the bur by the metal brush. As seen in FIG. 16, the metal brush is rotating, then the carriage is approached and pressed, and the surface burs are removed. Therefore, as the motion is shown in FIG. 16, each of the metal wires of the brush cuts the bur and cleans the surface each by each, so the stripes traces as the marks are left on the abrasive traces as shown in FIGS. 17A, 17B, and 17C. Therefore, the burs not removed are left on the edges as shown in FIG. 17A and the notched stripes traces are left on the edges as shown in FIG. 17C. In FIG. 17A, the burs are removed later by the knife using a microscope, if the burs not removed are left by any chance, they drop as the chip during HDD's working, then HDD may crash in danger. Further, the notches of FIG. 17C, which are made mostly on the final finish surface, cannot be removed. These notches might produce still smaller dusts from the edges. On the contrary, the burs and adhered dusts in the carriage surface which is polished as final finish by the magnetic beam processing employed by the present invention are removed by the magnetic abrasive materials being hitting the surface of the carriage as shown in FIGS. 18A, 18B, 18C, and 18D. Further, mechanical hitting power is utilized, so the hitting number of mechanical motion is ten to several tens times as many as the metal brush polishing number. Hence, the burs are removed, and the small notches, as shown in FIG. 17C, the traces of which are made by the metal brush being cutting roughly are changed to be rounded by the abrasive material as the pin being hitting them by the magnetic beam processing the direction of which is changed to the angle shown in FIG. 18C. The pictures of FIGS. 14 and 15 show these conditions obviously. Here, as seen in FIGS. 14 and 15, the traces like the lunar craters exist locally in the place where the above described pins hit strongly and they become the obvious features, so manual processing of FIGS. 5 and 6 and electrolytic polishing of FIGS. 8 and 9 are distinguished obviously by looking at the surfaces.

FIGS. 19A to 21B are measurement results of the unevenness size of irregularities of the carriage surface polished as final finish by the above described various polishing methods. FIGS. 19A to 21B are the measurement results measured by a surface roughness meter in the "x" and "y" directions of FIG. 22.

Figure 20A:
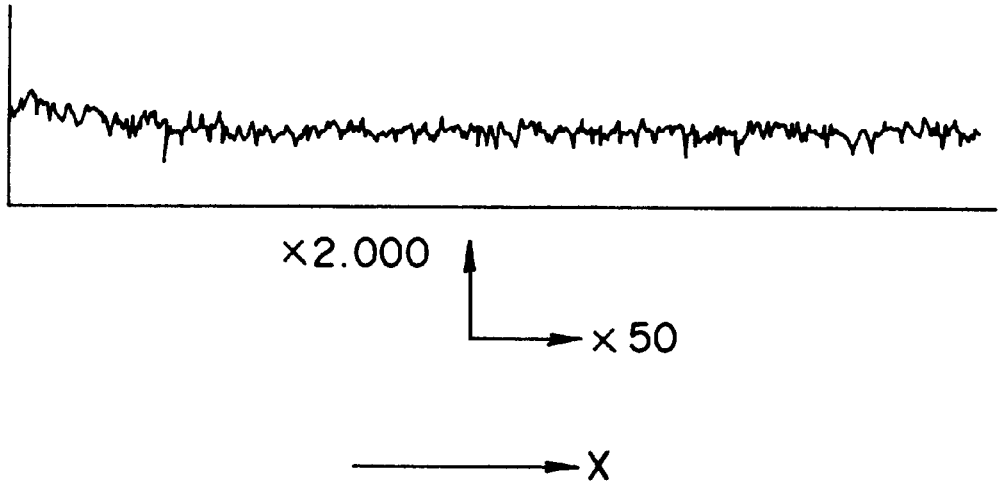
FIG. 20A is the measurement result of the size of traces of a carriage surface measured by a surface roughness meter after burs removal finish is made by conventional manual polishing.
Figure 20B:
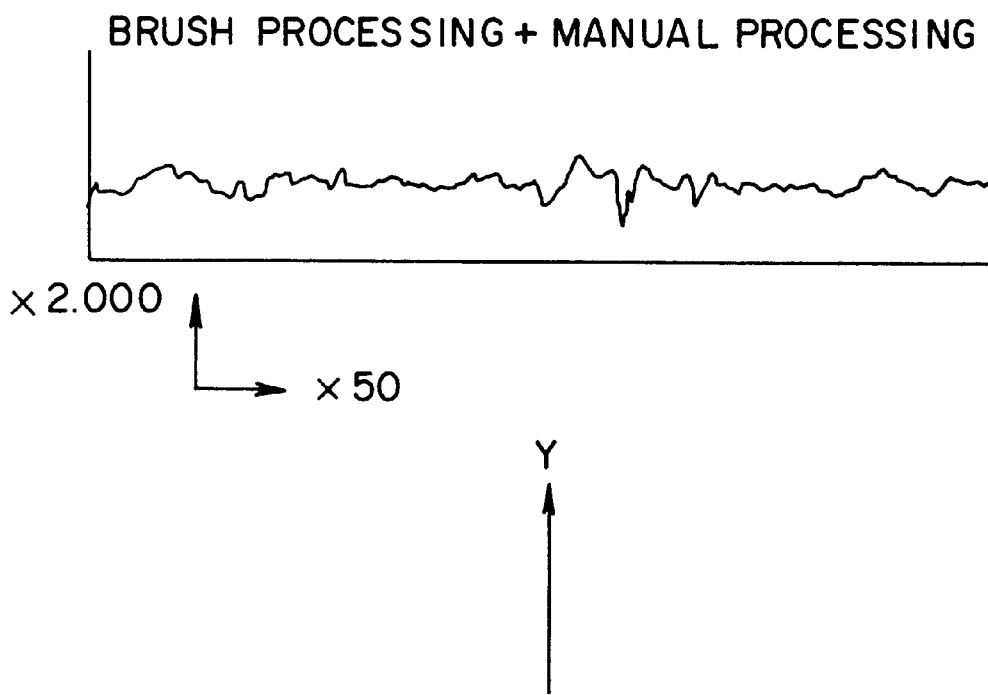
FIG. 20B is the measurement result of the size of traces of the carriage surface measured by the surface roughness meter after burs removal finish is made by conventional manual polishing.
Figure 21A:
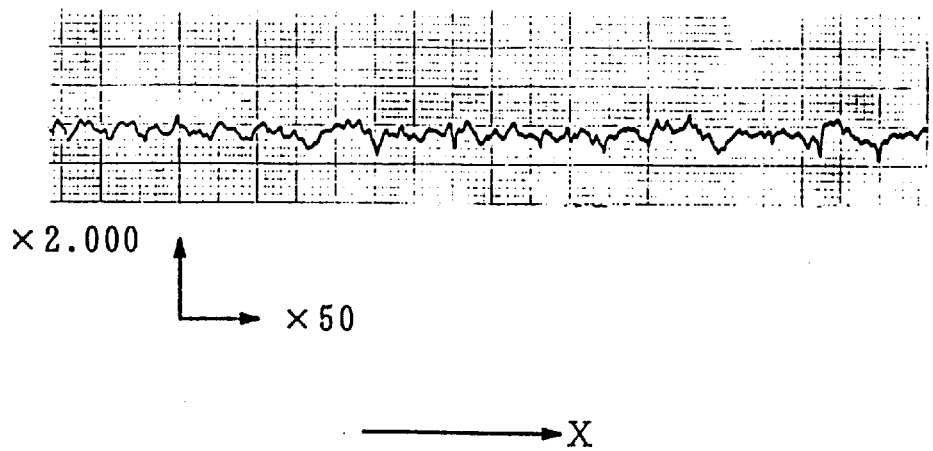
FIG. 21A is the measurement result of the size of traces of a carriage surface measured by a surface roughness meter after burs removal finish is made by magnetic beam processing as magnetic polishing of the present invention.
Figure 21B:
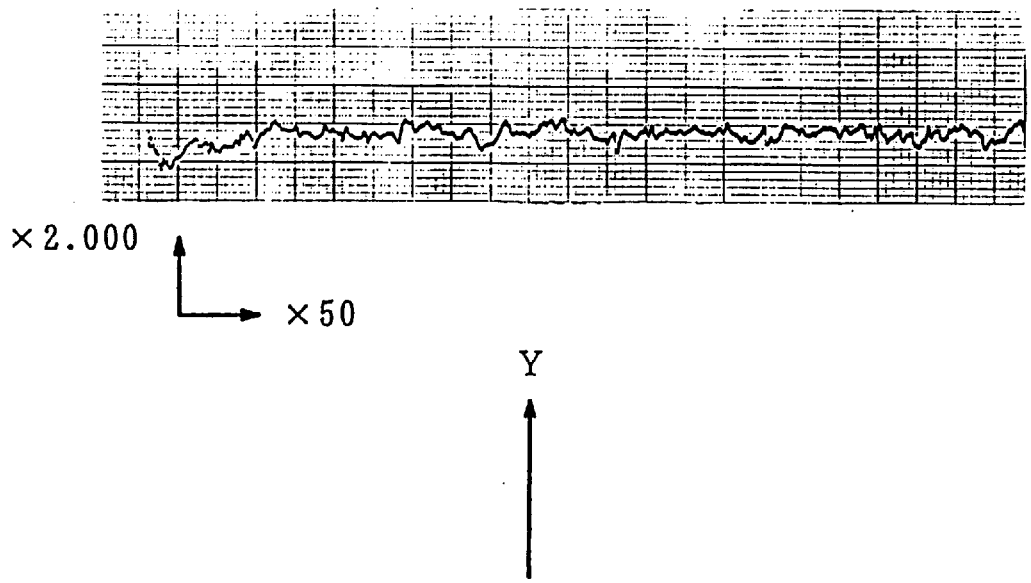
FIG. 21B is the measurement result of the size of traces of the carriage surface measured by the surface roughness meter after burs removal finish is made by magnetic beam processing as magnetic polishing of the present invention.
Figure 22:
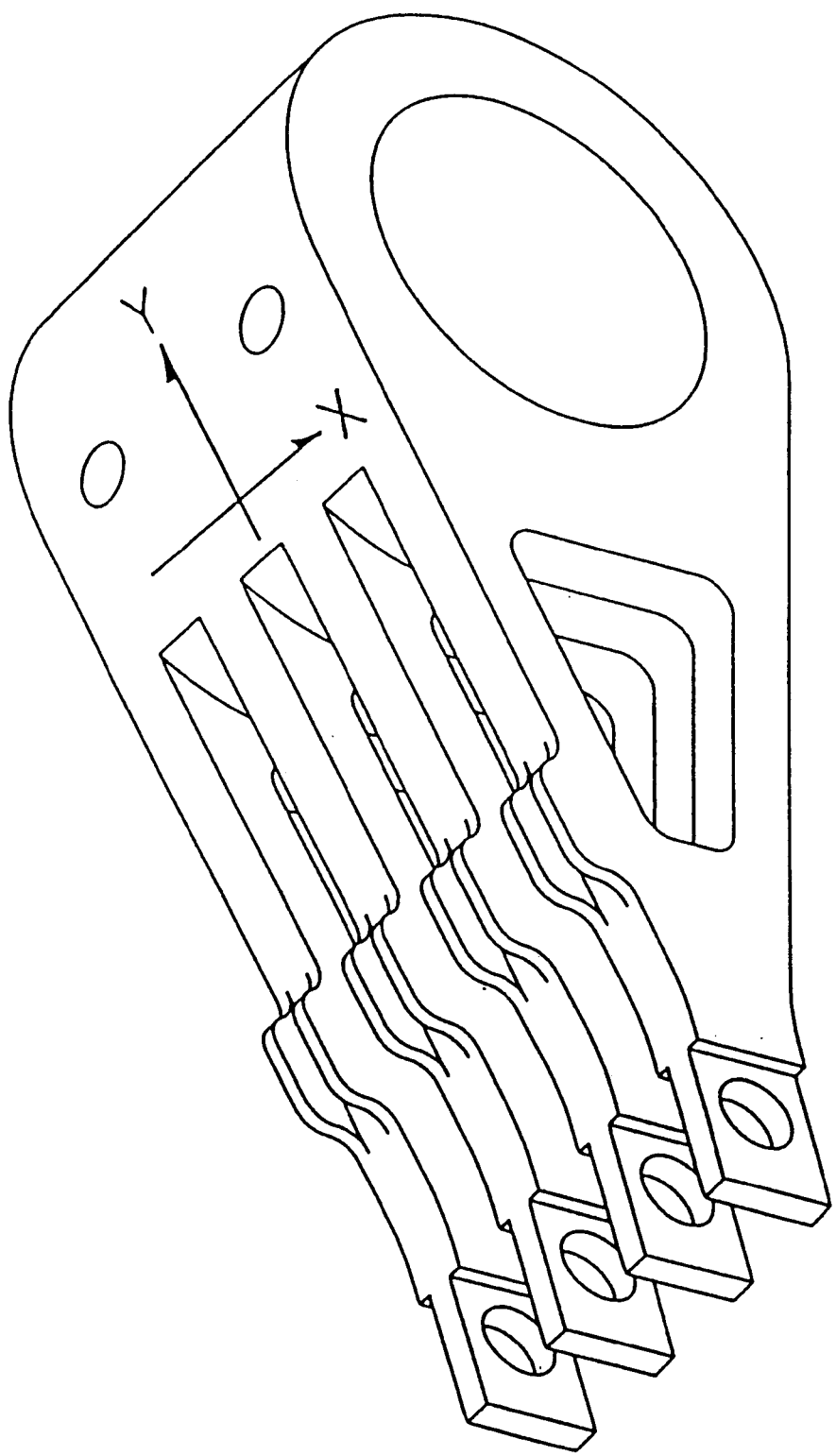
FIG. 22 illustrates a spot measured in FIGS. 19A, 19B, 20A, 20B, 21A, and 21B.

There is obvious one unevenness direction of the irregularities in manual processing as seen in FIGS. 20A and 20B, but there is not obvious one unevenness direction of the irregularities in the magnetic beam processing and the irregularities are spread evenly in the various way as seen in FIGS. 21A and 21B.

Figure 19A:
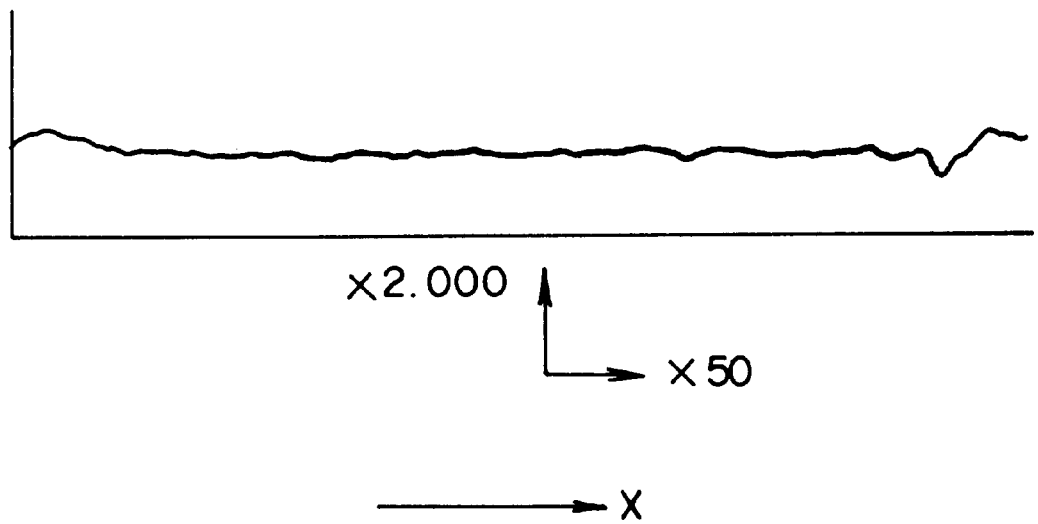
FIG. 19A is the measurement result of the size of traces of a carriage surface measured by a surface roughness meter after burs removal finish is made by electrolytic polishing.
Figure 19B:
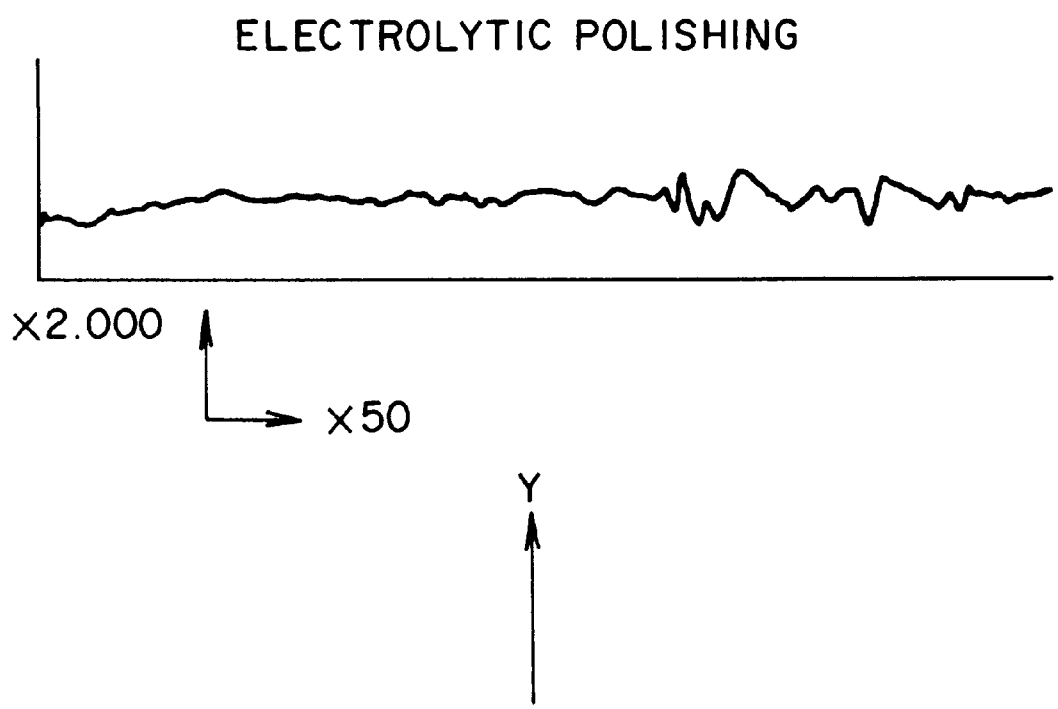
FIG. 19B is the measurement result of the size of traces of the carriage surface measured by the surface roughness meter after burs removal finish is made by electrolytic polishing.

Here, in the case of electrolytic polishing of FIGS. 19A and 19B, the surface is still smoother than the two polishing methods explained in the above, but electrolytic polishing cannot be applied for carriage polish because the surface precision is bad as explained before.

Compared with the carriage polished as final finish by conventional manual processing, the HDD magnetic head carriage polished as final finish by the magnetic beam processing as magnetic polishing employed by the present invention has the following strong points.

(1) The HDD magnetic head carriage polished as final finish by the magnetic beam processing as magnetic polishing employed by the present invention has the carriage surface forming non-directional pome face having extreme tiny hit traces by pin abrasive materials. This surface creation effect is thought as an evenness surface layer having no directions of crystal particles flows based on the theory of the metal composition, compared with the surface having the traces direction made by such processing as polish processing, cutting work, brush processing as final finish by the conventional manual processing, and so forth.

Hence, it is difficult for the parts shape precision to change for a long time against effecting power and generated heat energy power during HDD's working. In other words, when the direction is made in a processing deterioration layer of the surface of the magnetic head carriage plate of the hard disc drive, it is difficult to keep the shape precision because the aged deterioration is not the same.

(2) To form non-directional pome surface having the above described extreme tiny hit traces has caused compressed residual stress. The products in which the compressed residual stress is applied on the processing surface has the feature in which it is capable of bearing up tensile force by the outside in general, so the influence by the residual stress caused by various power repeatedly, huge number of times, applied to the carriage can be the smallest.

Therefore, the shape precision, 1/1000 mm precision right after the carriage processing, can be maintained during HDD's driving for several years.

(3) Especially, for the above described shape maintenance effect, the surface polished as final finish by magnetic beam processing as magnetic abrasive is made in each of the surfaces of the comb slits of the magnetic head carriage of the above described HDD.

On the contrary, the carriage surface polished as final finish by manual processing is not a smooth final finish surface through the entire comb slits, so the finish differences are made for inside and outside finish surfaces of the complicated carriage comb. Thus, the differences are made based on each aged deterioration of the comb by various power to the carriage and heating energy generated by HDD being driven.

(4) Assume that the surface roughness is the same, compressed residual magnetism remains on the surface polished as final finish by magnetic beam processing as magnetic abrasive. Erosion tolerance is big on the surface having compressed residual stress, so the polished surface of the present invention has the corrosion-resistant effect compared with the final finish surface by other manual processing. This means that it is difficult for erosion powder in order to erode to exist on the carriage surface, especially on the edges, made of aluminum alloy and the surface condition of the original aluminum alloy is kept for a long time. For other polish methods having the erosion possibility, there is a risk in which the above described erosion powder secedes and falls away during HDD being driven. HDD is a high-tech product for being driven with high speed in an extremely narrow space, so it extremely hates dust in the air. An incorrect action is made in read/write operation of the magnetic head if the above described isolation-fallout erosion powder exists on the magnetic surface of the magnetic disc. Especially, if the above described dust enters in the magnetic head, crushing is made between the head and the disc, severe malfunction not recoverable is made, and finally big accident may happen in electric data processing.

What is claimed is:

1. A carriage for a magnetic head of a hard disc drive produced by the following method:

cutting a block of non-magnetic material of aluminum alloy formed by extrusion molding or drawing method to make a work piece including a work base member and a plurality of plate members as arm members formed in a comb shape extending parallel from said base member;

firstly rough finishing said work pieces by a group of nylon brushes containing rough polish grind particles or metal brushes;

inserting said work pieces in a magnetic abrasive brush formed by magnetic abrasive materials being kept between magnetic poles;

polishing and removing burs on surfaces of said work pieces by giving reciprocation and/or vibration motion to said work pieces or magnetic abrasive materials as a final finish.

2. The carriage for the magnetic head of the hard disc drive according to claim 1, wherein said step of polishing and removing burs on surfaces of said work piece is applied by giving reciprocation and/or vibration motion to said magnetic abrasive materials relatively, the relative magnetic permeability of which is from 1.5 to 200.

3. The carriage for the magnetic head of the hard disc drive according to claim 2, wherein said step of polishing and removing burs on surfaces of said work pieces is applied by giving reciprocation and/or vibration motion to said magnetic abrasive materials relatively, said magnetic abrasive materials are made of stainless steel, or nickel alloy or iron alloy having the same hardness as said stainless steel.

4. The carriage for the magnetic head of the hard disc drive according to claim 1, wherein said step of polishing and removing burs on surfaces of said work pieces is applied by giving reciprocation and/or vibration motion to said magnetic abrasive materials relatively, the shape of said magnetic abrasive particles are a cylindrical pillar or a polygon pillar having an end face which is a sharp pin.

5. The carriage for the magnetic head of the hard disc drive according to claim 4, wherein said step of polishing and removing burs on surfaces of said work pieces is applied by giving reciprocation and/or vibration motion to said magnetic abrasive materials relatively, the diameter of said magnetic abrasive materials being from 0.1 to 1.5 mm, and the length of said magnetic abrasive materials being from 0.1 to 1.5 mm.

6. The carriage for the magnetic head of the hard disc drive according to claim 1, wherein said step of polishing and removing burs on surfaces of said work pieces is applied by giving reciprocation and/or vibration motion to said magnetic abrasive materials relatively, said magnetic abrasive materials are made by mixing different sizes of materials.

* * * * *